United States Patent
Chen et al.

(10) Patent No.: US 8,913,061 B2
(45) Date of Patent: Dec. 16, 2014

(54) AUTOMATIC TRACING ALGORITHM FOR QUANTITATIVE ANALYSIS OF CONTINUOUS STRUCTURES

(75) Inventors: Nan-Yow Chen, Taipei County (TW); Ting-Kuo Lee, Taipei (TW)

(73) Assignee: Academia Sinica, Taipei (TW)

( * ) Notice: Subject to any disclaimer, the term of this patent is extended or adjusted under 35 U.S.C. 154(b) by 859 days.

(21) Appl. No.: 12/977,570

(22) Filed: Dec. 23, 2010

(65) Prior Publication Data

US 2011/0157177 A1 Jun. 30, 2011

Related U.S. Application Data

(60) Provisional application No. 61/290,176, filed on Dec. 25, 2009.

(51) Int. Cl.
*G06T 15/00* (2011.01)
*G06T 7/00* (2006.01)

(52) U.S. Cl.
CPC ..... *G06T 7/0081* (2013.01); *G06T 2207/10056* (2013.01); *G06T 2207/20148* (2013.01); *G06T 2207/30101* (2013.01)
USPC ........... 345/424; 345/419; 345/428; 345/582; 382/128; 382/259

(58) Field of Classification Search
CPC ................... G06T 7/0081; G06T 2207/30101; G06T 2207/20148; G06T 2207/10056
USPC ........... 345/419, 424, 428, 582; 382/128, 259
See application file for complete search history.

(56) References Cited

U.S. PATENT DOCUMENTS

| | | | |
|---|---|---|---|
| 7,953,262 B2* | 5/2011 | Suryanarayanan et al. | .. 382/128 |
| 8,041,141 B2* | 10/2011 | Farag et al. | ... 382/259 |
| 8,345,940 B2* | 1/2013 | Mattiuzzi et al. | ... 382/128 |

OTHER PUBLICATIONS

Hamid et al, 3-D Quantification and Visualization of Vascular Structures from Confocal Microscopic Images using Skeletonization and Voxel-Coding, Computers in Biology and Medicine 35, 2005, pp. 791-813.*
Rodriguez et al, Three-Dimensional Neuron Tracing by Voxel Scooping, Journal Neurosci Methods, Oct. 2009, pp. 169-175.*

* cited by examiner

*Primary Examiner* — Phu K Nguyen
(74) *Attorney, Agent, or Firm* — WPAT, P.C.; Anthony King

(57) ABSTRACT

This invention provides an automatic tracing algorithm for quantitative analysis of continuous structures, such as the images of tree-like or network-like structures. The algorithm includes the steps of encoding 3-D image voxels by using a source field encoding methodology followed by a defined image threshold, tracing the codelets along encoded voxels such that the characteristic element of a 3-D image such as the center line of fiber, fiber branch, loop, and end point can be determined systematically, and achieving the automatic analysis without manual intervention. In addition, quantitative measurements are exquisitely calculated by the location and distance of these characteristic elements between coded voxels. The algorithm is more suitable to automatically analyze the 2D/3D images of complex neurons, blood vessels, collagens in skin tissue, and fibril morphology in polymeric materials.

20 Claims, 24 Drawing Sheets

US 8,913,061 B2

AUTOMATIC TRACING ALGORITHM FOR QUANTITATIVE ANALYSIS OF CONTINUOUS STRUCTURES

BACKGROUND OF THE INVENTION

1. Field of the Invention

The present invention relates to an automatic tracing algorithm for a quantitative analysis of continuous structures, and more particularly to an algorithm of a quantitative analysis that encodes voxels of images of a continuous structure and automatically traces this continuous structure.

2. Description of the Related Art

In recent years, computer software and digital image technology advance rapidly. For example, a magnetic resonance imaging (MRI) result of a brain can be divided to create independent 3D images of each tissue for an analysis according to the properties of the tissue, or a blood vessel photography is used for taking the photos of blood vessels by a confocal imaging microscope (OCT) to produce 2D or 3D images for the analysis, or the confocal laser scanning microscope or any other imaging technique is used for obtaining a complicated 3D digital image of a neural structure, a distribution of blood vessels, and so on. However, it is a very challenging problem to analyze such a large volume of 2D or 3D digital images to obtain useful and quantitatively accurate information.

U.S. Pat. No. 5,872,861 disclosed a blood vessel imaging method that compares the intensity of a pixel with a pixel at the center line of the blood vessel to find stenoses of vessel. U.S. Pat. No. 7,480,400 disclosed a neural fiber tractography for analyzing 3D digital images by a magnetic resonance imaging water molecule diffusion tensor imaging (DTI) method. The method mainly uses a group of selected three-dimensional voxels to find a seed point by a different method, and then uses a distance threshold of the seed point to eliminate the voxel so as to trace a pathway of neural fiber. In the method of finding the seed point in accordance with this patented technology, the direction of a diffusion tensor axis (or the direction of a neural fiber) of a near pixel or the included angle between the relative position of the pixel and the axis, and the fractional anisotropy are used for determining the seed point.

The neural fiber, blood vessel, collagen in skin tissue, or many polymeric materials are continuous structures, such as line-structures, tree-like structures, network-like structures or neuron-like structures. If an image of the continuous structure is analyzed by a quantitative analysis, the moving direction of the structure is traced. For example, a method for tracing the moving direction of a blood vessel is disclosed by U.S. Pat. Publication No. 2006/0056694, wherein a definite starting point is set for a 3D image of a tree-like structured anatomical coronary vessel, and then a tracing codelet (segment) is moved along a definite image of the blood vessel section by section, and information of a distance direction is created. However, the determination of the moving direction by this method generally requires a manual determination, particularly at a branch or a loop. In addition, this method can analyze a main path only. For an analysis of the branch of a tree-like structure, it is necessary to select the starting point repeatedly and use the tracing codelet analysis so that the analysis not only takes much manpower, but also lacks objectivity, affects the result and fails to achieve the effect of an automatic analysis due to human factors.

In an article of Journal of Neuroscience Methods, 178, P.197-204 in 2009 by Zlatko V. and Armen S. and U.S. Pat. No. 7,072,515, a fully automatic line-structured 2D or 3D fluorescence confocal microscopy image tracing method is disclosed. The method mainly selects a seed point in a line-structure as a starting point, and traces the center line of the line-structure from the starting point to the next position, and the next position is set as a new starting point to repeat the step of tracing the center line of the line-structure until an end point of the line-structure is reached. In FIG. 1, N×M grids are used for representing line-structured neural fibers, wherein the center line of the line-structure is traced on an X-Y plane and in a Z-axis direction, and four templates are shared, and two 2D templates are used for the left and right directions on the X-Y plane, and two 2D templates are used in the up and down directions along the Z-axis direction, and the line-structure is divided into $N^2$ directions. For example, if N=32, then four templates are divided into $4 \times 32^2 = 4096$ directions such that the starting point Pi is moved to the position of the next starting point Pi+1 according to the axis of the line-structure so as to trace the whole line-structure. Although this method can automatically trace the whole line-structure, yet it is difficult to use the method to trace a more complicated structure, such as a branch point or a loop of the neural fiber. In addition, these seed points are generated according to a certain selected condition. If some conditions are not defined appropriately, the seed point will be insufficient for tracing the whole structure such that the structure will form unconnected segments. Now, it is necessary to connect the segments with manual intervention.

In an article of Journal of Neuroscience Methods, 184, P.169-175 by Alfredo R., Douglas B. E., Patrick R. H. and Susan L. W. in 2009, a dynamic data segment is used for forming a funnel-shaped three-dimensional voxel, and computing a moving distance by a displacement during a tracing in order to trace the whole confocal microscopy image. Although this method can trace a confocal microscopy image having a branch image, yet the method involves a large volume of computations, which is unfavorable to a quick computation.

As to a process of encoding three-dimensional voxels to a branched skeleton of a confocal microscopy image disclosed in an article of Computers in Biology and Medicine, 35, P.791-813 in 2005 by Hamid S. Z., Ali S., Mohammad-Mehdi K., Zheng G. Z., Reza A. Z., Mahnaz M. and Michael C., the confocal microscopy image is rebuilt by a quantitative method. This method can connect confocal microscopy images with disconnected branches into a connected image, or trim an image branch, and apply the coded result to calculate the length. However, this method still requires manual intervention.

In view of the insufficiency of the prior art, an automatic tracing algorithm for a continuous structure without manual intervention is introduced, and the tracing algorithm with the least computing volume is urgently required for automatically tracing and analyzing image data of the continuous structure including the neural fiber, blood vessel, collagen in skin tissue of a line-structure, a tree-like structure, a network-like structure or a neuron-like structure, or images of various types of polymeric material fibers.

SUMMARY OF THE INVENTION

Therefore, it is a primary objective of the present invention to overcome the aforementioned shortcomings of the prior art by providing an automatic tracing algorithm for a quantitative analysis of continuous structures, wherein the tracing algorithm is used for an automatic tracing and a quantitative analysis of 2D images or 3D images of a continuous structure, and the continuous structure is a line-structure, a tree-like structure, a network-like structure or a neuron-like structure, but the invention is not limited to such arrangements only. The continuous structure comprises at least one characteristic element, and the characteristic element is a soma, a fiber, a branch, a loop, a synapse or a dead end. After a 2D image or 3D image is captured by an X-ray microscope, a tunneling microscopy, a confocal imaging microscope (OCT), a confocal laser scanning microscope, and an equivalent equipment, the 2D or 3D image is formed for the analysis. The automatic tracing algorithm for a quantitative analysis of 3D images comprises the steps of:

S1: capturing a 3D image of a continuous structure and digitizing the 3D image, wherein the 3D image is comprised of three-dimensional voxels;

S2: selecting a starting point voxel and assigning a starting point code to the starting point voxel, wherein the starting point code is N1, but the invention is not limited to such arrangement only, and the starting point voxel is any voxel at any edge of the 3D image, or any voxel at the central area of any soma;

S3: setting an intensity threshold of the 3D image, and encoding all voxels of the 3D image matched with the intensity threshold from the starting point voxel N1 by a source field encoding methodology, wherein the intensity threshold includes the quality, noise condition, selected color or selected gray scale of the 3D image, and the source field encoding methodology comprises the steps of:

S31: assigning a voxel code to all voxels adjacent to the starting point voxel N1 and matched with the intensity threshold, wherein the voxel code is incremented from the starting point code N1 by an integer such that the voxel code of the voxel adjacent to the starting point voxel N1 is N2;

S32: using the voxel code of N2 as the next starting point, and assigning a voxel code of N3 to each voxel adjacent to the voxel code of N2 and matched with the intensity threshold;

S33: repeating the step S32 until all pixels of the 3D image matched with the intensity threshold are encoded; and S4: using a standard code tracking to identify the characteristic element of the 3D image, wherein the standard code tracking comprises the steps of:

S41: using three or more connected voxels to form a tracing codelet [Np+t−1, Np+t−2, . . . , Ng, . . . , Nt] starting from any direction of the starting point voxel N1, wherein the tracing codelet length is p voxels; the starting point of the tracing codelet is the voxels with a voxel code Np+t−1, the center of mass of the tracing codelet is the voxel with a voxel code Ncp, and the end point is a voxel with a voxel code Nt; and if the tracing codelet is comprised of three voxels (p=3), then the tracing codelet starting from the starting point voxel N1 has t=1, the tracing codelet=[N3, N2, N1], the starting point of the tracing codelet=N3, the center of mass=N2, and the end point=N1;

S42: tracing the tracing codelet [Np+t−1, Np+t−2, . . . , Nt] from the starting point of the tracing codelet Np+t−1 to next voxel code by a source field encoding in each direction;

S43: using the next voxel code as a starting point (t=t+1) of the tracing codelet and repeating the step S42 until all voxel codes of the 3D image are traced; and S44: identifying each characteristic element in the 3D image, and recording a voxel code at the position of the characteristic element of the continuous structure.

Another objective of the present invention is to provide an automatic tracing algorithm for a quantitative analysis of continuous structures, wherein the automatic tracing algorithm for the quantitative analysis can further compute the quantity of characteristic elements, the length of a characteristic element, the cross-sectional area of a characteristic element, the surface area of a characteristic element, the volume of a characteristic element, the distance between any two characteristic elements of a continuous structure, the angle of relative positions of any two characteristic elements, and the moving direction of the center line of a characteristic element.

A further objective of the present invention is to provide an automatic tracing algorithm for a quantitative analysis of continuous structures, wherein the steps S1 and S3 can use an intensity threshold to filter the 3D image first, and then capture the voxel of the 3D image within the range of the intensity threshold so as to simplify the process of encoding the 3D image.

As to the 2D image of a continuous structure, the automatic tracing algorithm for a quantitative analysis of continuous structures in accordance with the present invention can be used directly for 2D images. The 2D image of the continuous structure is digitized such that the 2D image is comprised of 2D pixels. The encoding, tracking and computing volume are the same as the foregoing procedure, except that the pixels of 2D images are changed to the voxels of 3D images.

In summation of the description above, the automatic tracing algorithm for a quantitative analysis of continuous structures in accordance with the present invention has the following advantages:

(1) The algorithm can be used for automatically encoding 2D image pixels or 3D image voxels of a continuous structure. After the starting point of a voxel (or pixel) is set according to the intensity threshold by the source field encoding methodology, the image voxel (or pixel) of the whole continuous structure can be encoded, and each voxel (or pixel) is given a voxel code (or pixel code). The voxel code (or pixel code) represents the relation of proximity and derivation.

(2) The 2D image pixel or 3D image voxel after encoding can be used for an automatic tracing analysis. The tracing codelet can be used for determining each characteristic element such as a soma, a fiber, a branch, a loop, a synapse and a dead end of an image.

(3) The voxel code of each characteristic element can be used for the quantitative analysis, and an interval of voxel codes of a characteristic element can be used for calculating quantified information such as the number of characteristic elements, the distance between two characteristic elements, the cross-sectional area of a characteristic element, a distance between any two characteristic elements in a continuous structure, and a relative angle of any two characteristic elements in a continuous structure provided for practical applications, such as the analysis of blood vessel configurations, the length and density of neural cells, collagen structures, paper fibers, and the aging level of biological tissues or pathological slice analysis. It is noteworthy to point out that each application is not limited to the aforementioned items.

(4) If an intensity threshold of another setting is changed, such as a change of a specific color or a specific gray scale, an image with the specific color or gray scale can be coded, traced, and quantitatively analyzed so as to achieve an analysis for structures of different densities or different colors, and extend the scope of practical applications.

DETAILED DESCRIPTION OF THE PREFERRED EMBODIMENTS

The foregoing and other objectives, characteristics and advantages of the present invention will become apparent by the detailed description of a preferred embodiment as follows. It is noteworthy to point out that each preferred embodiment is provided for the purpose of illustrating the present invention only, but not intended for limiting the scope of the patent claims.

Figure 1:
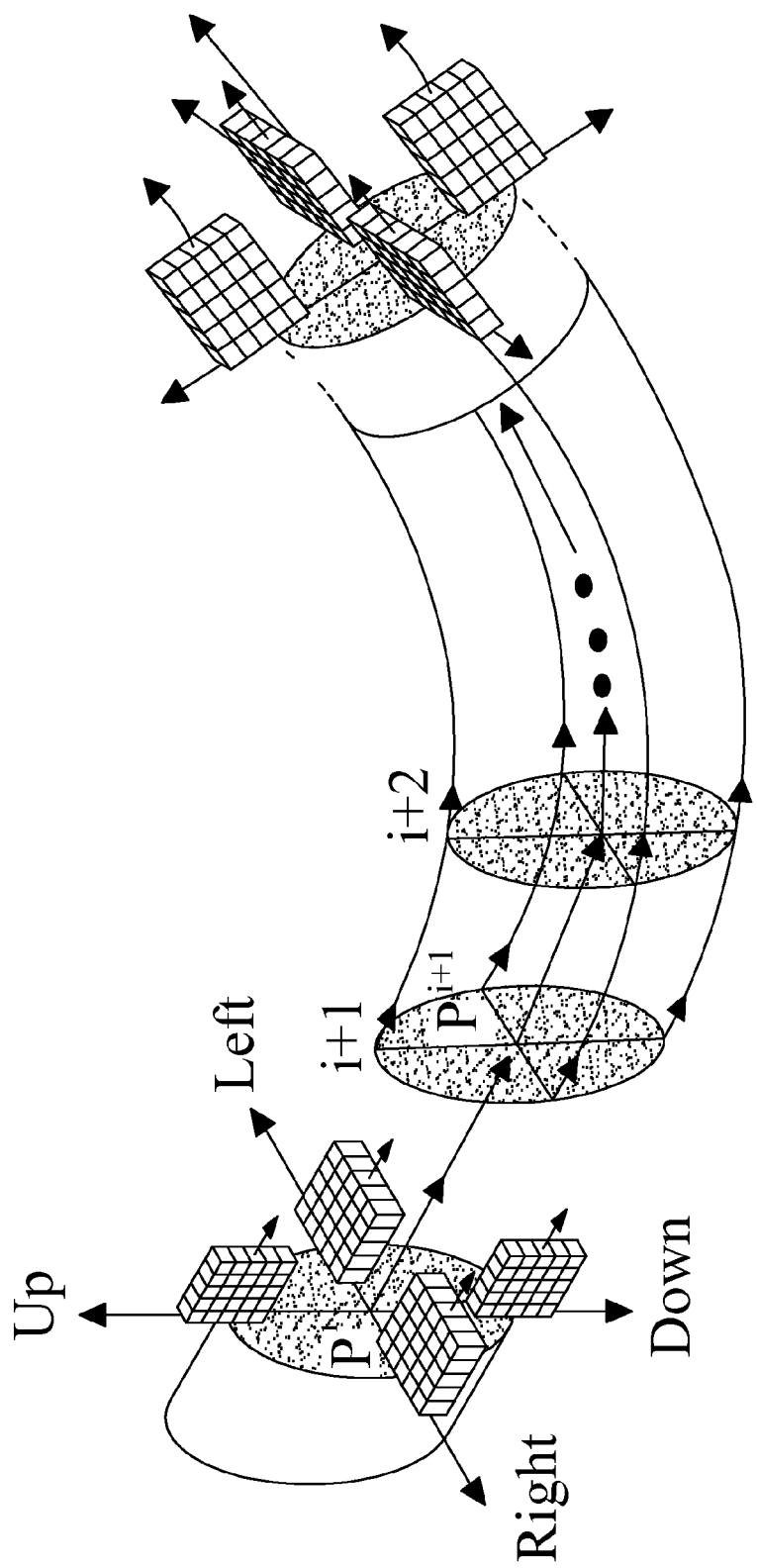
FIG. 1 shows a conventional fully automatic tracing methodology for a line-structured fluorescence confocal microscopy image.
Figure 2:
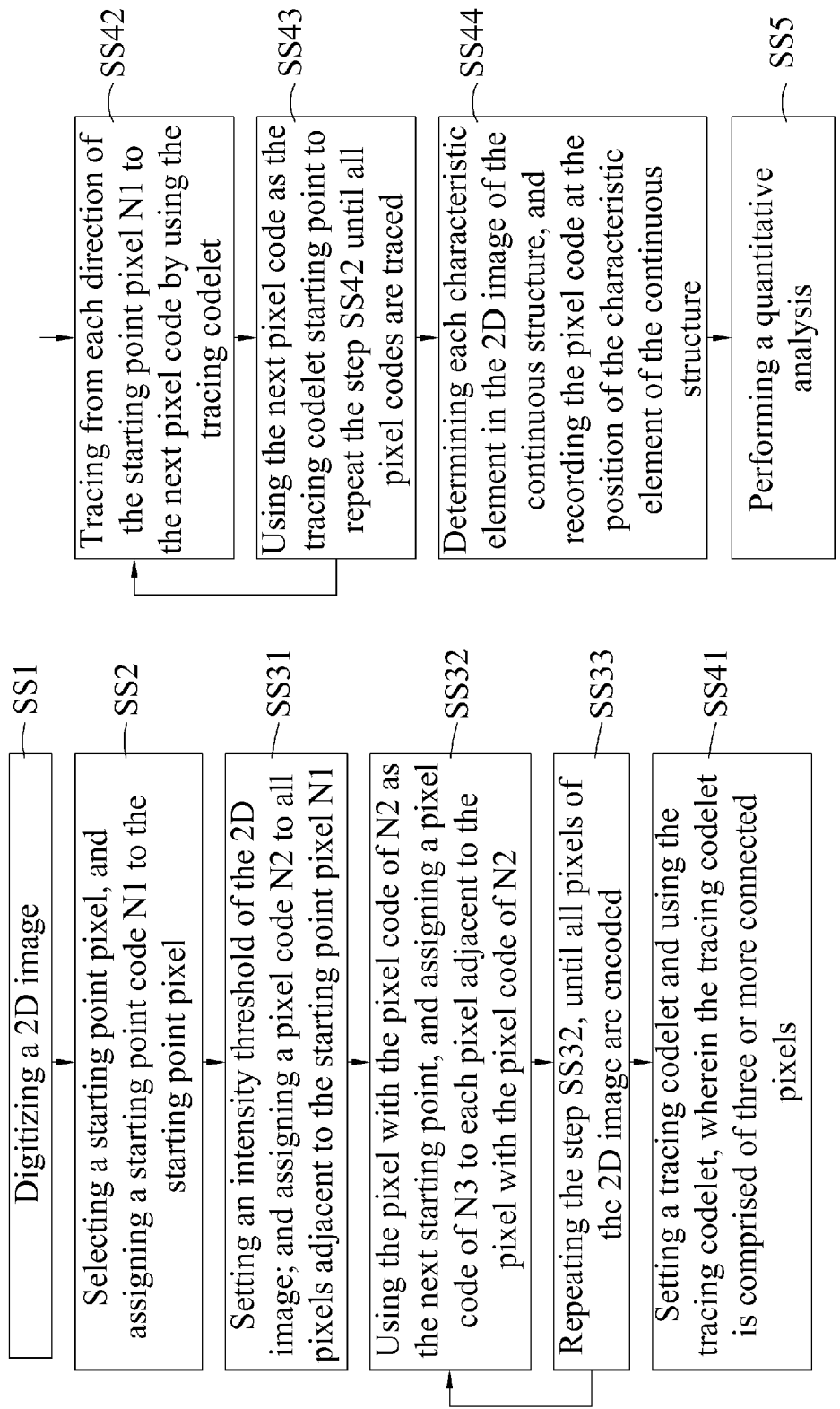
FIG. 2 is a flow chart of an automatic tracing algorithm for a quantitative analysis of continuous structures in accordance with the present invention.
Figure 3:
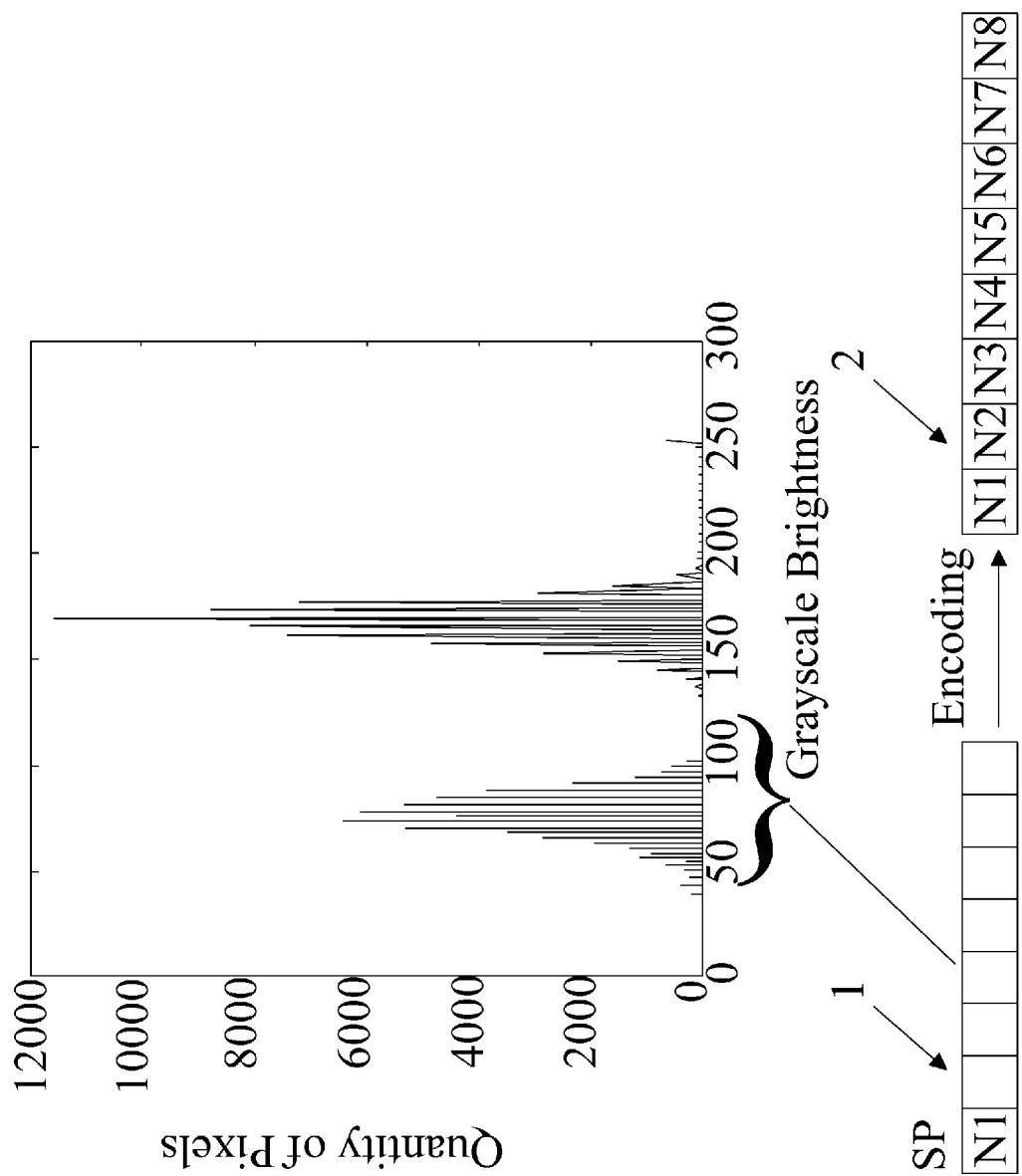
FIG. 3 is a first schematic view of an automatic tracing algorithm for a quantitative analysis of continuous structures in 2D image codes in accordance with the present invention.
Figure 4:
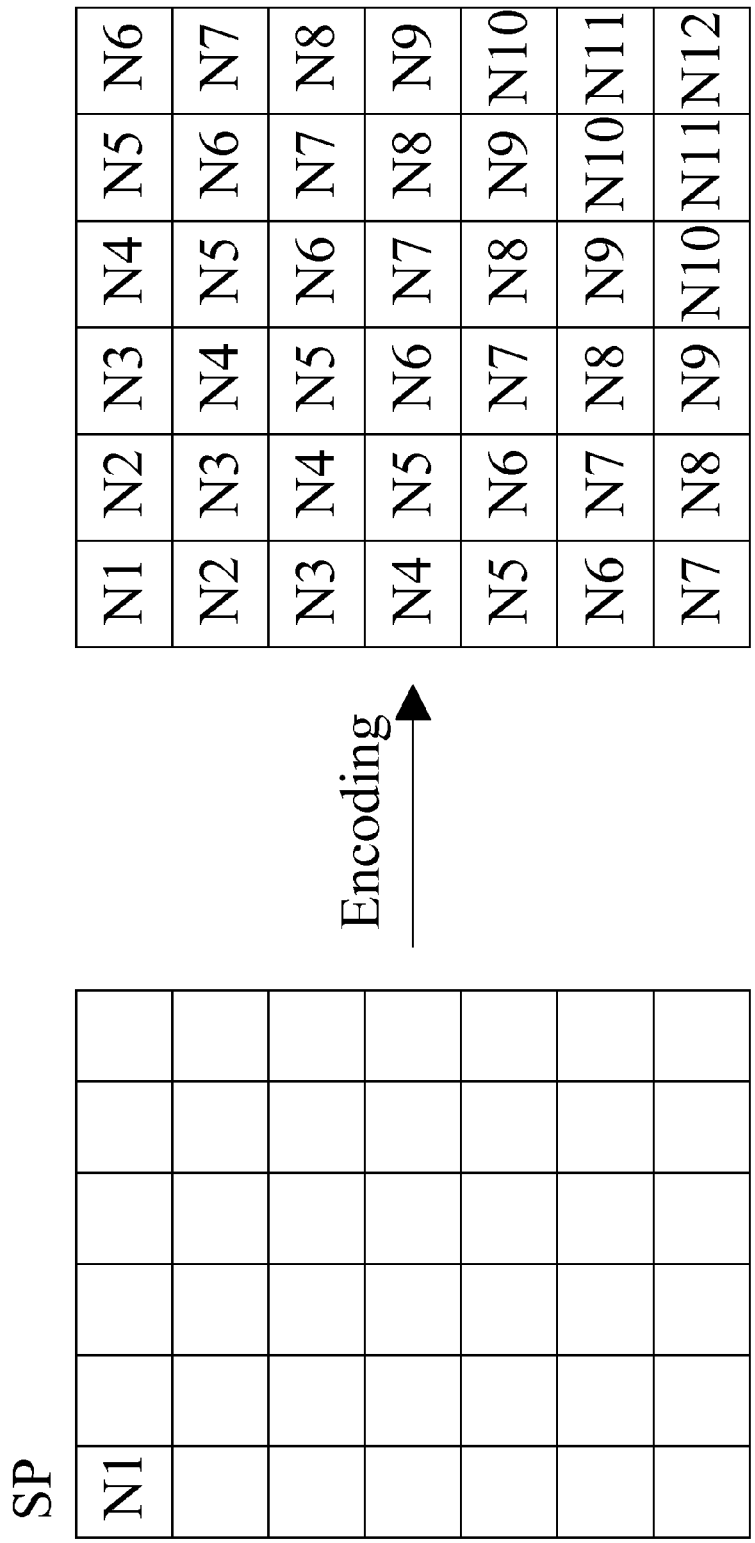
FIG. 4 is a second schematic view of an automatic tracing algorithm for a quantitative analysis of continuous structures in 2D image codes in accordance with the present invention.
Figure 5:
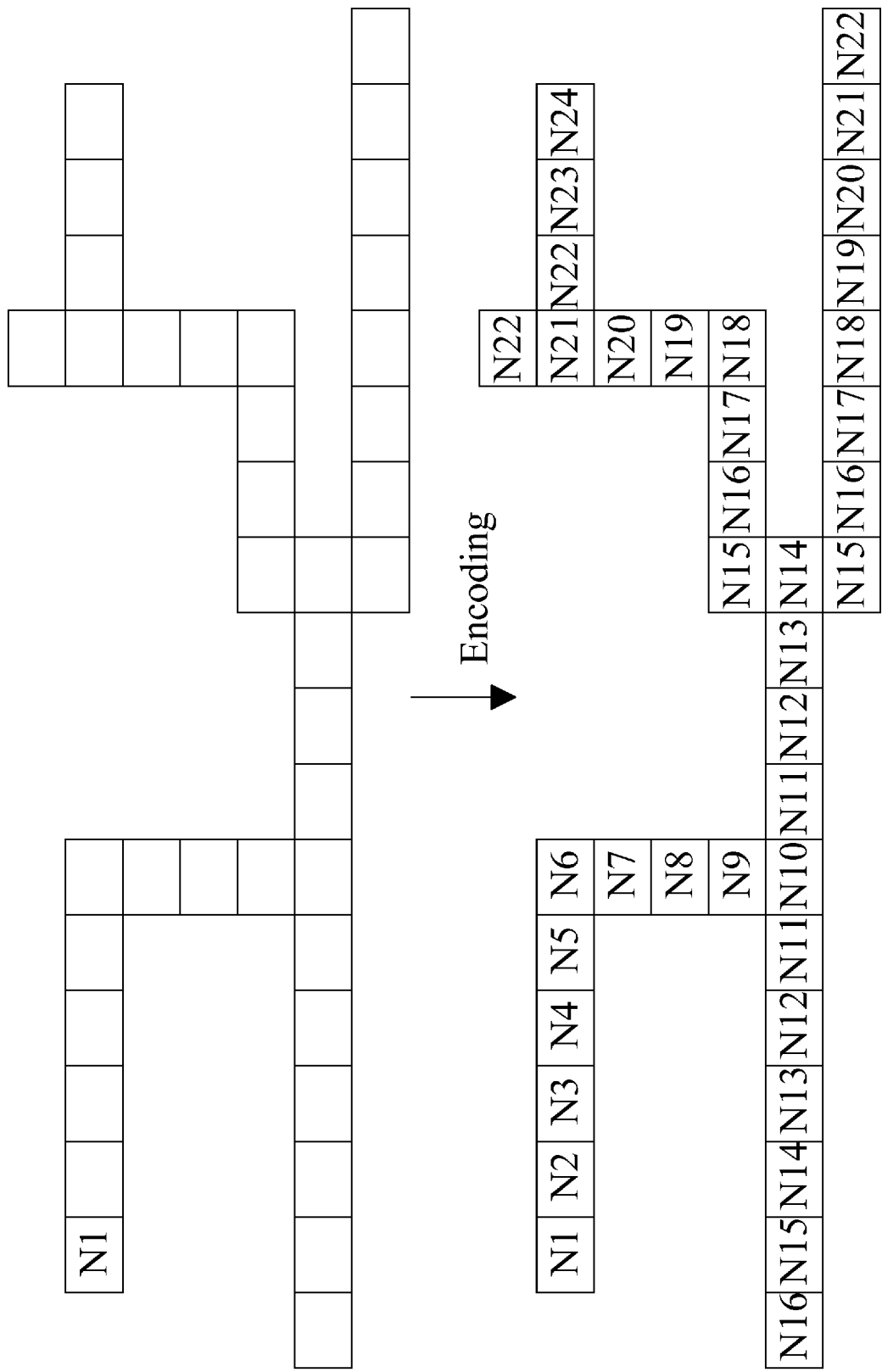
FIG. 5 is a third schematic view of an automatic tracing algorithm for a quantitative analysis of continuous structures in 2D image codes in accordance with the present invention.
Figure 9:
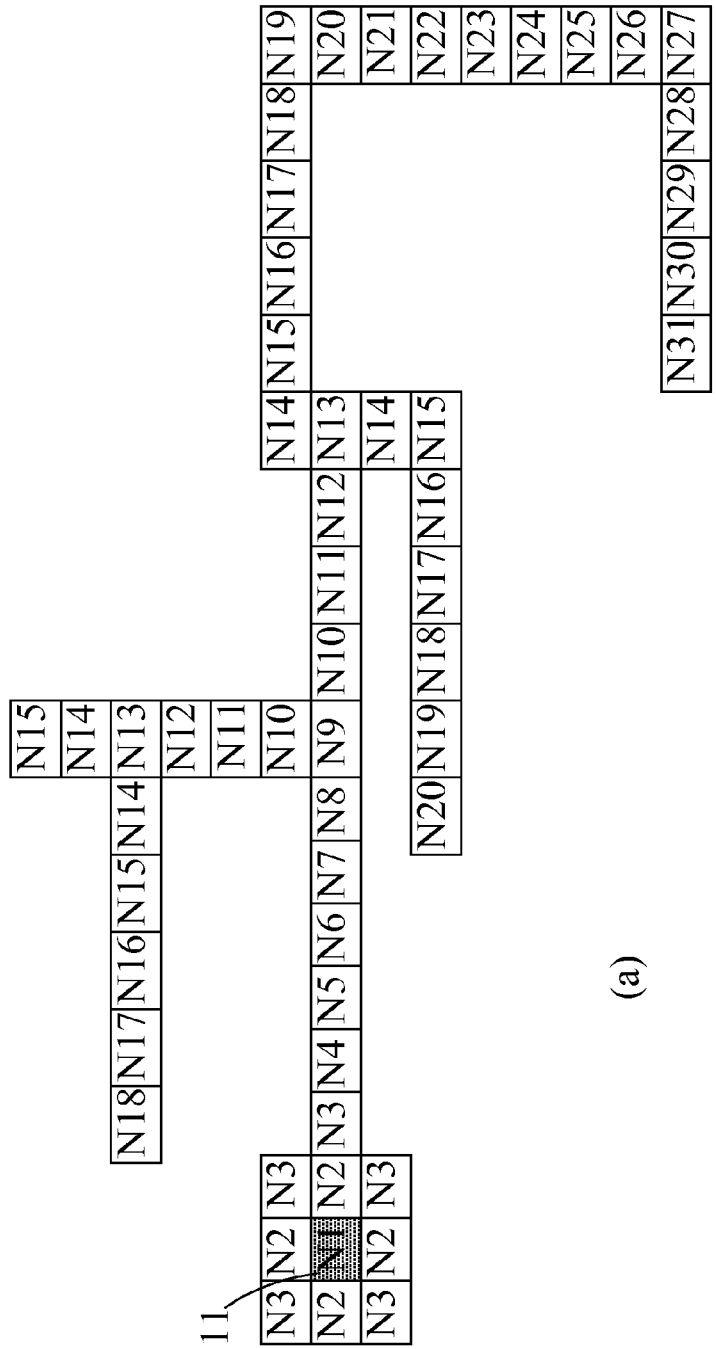
FIG. 9 is a first schematic view of a standard code tracking step and a step of determining a branch point of a characteristic element in accordance with the present invention.
Figure 10:
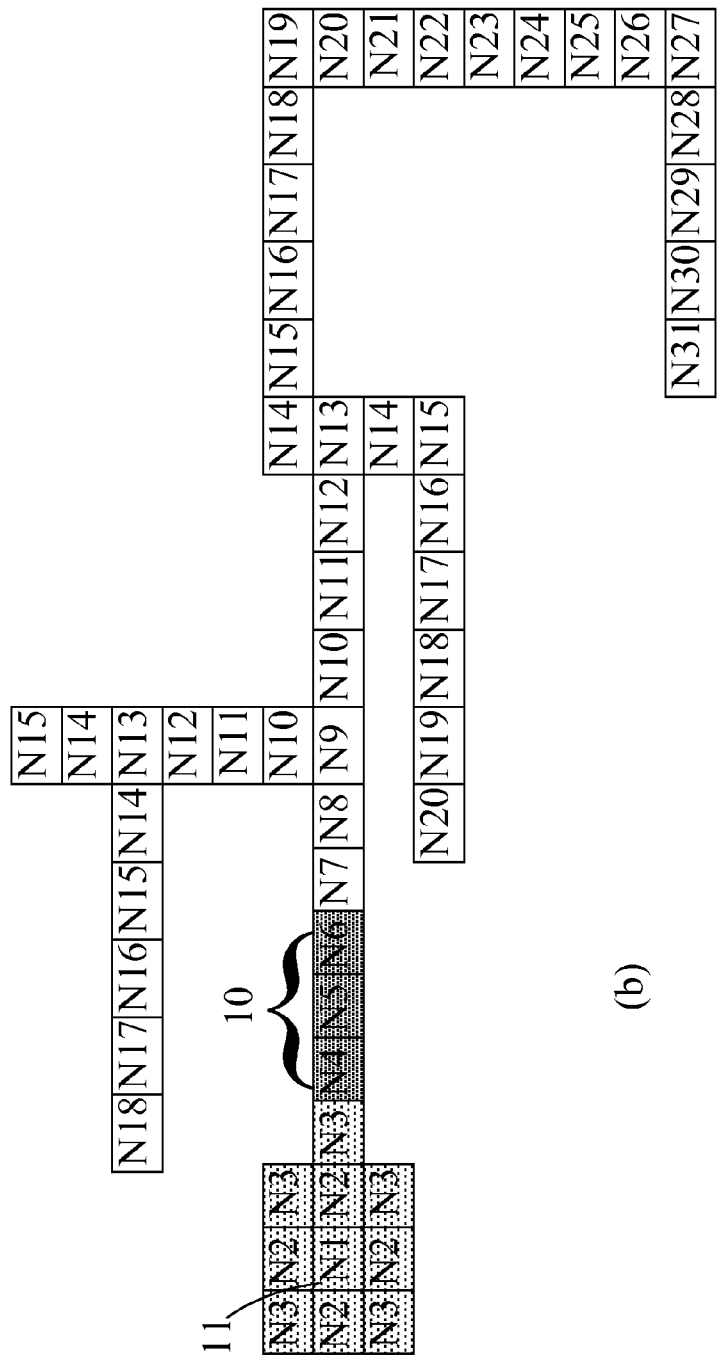
FIG. 10 is a second schematic view of a standard code tracking step and a step of determining a branch point of a characteristic element in accordance with the present invention.
Figure 11:
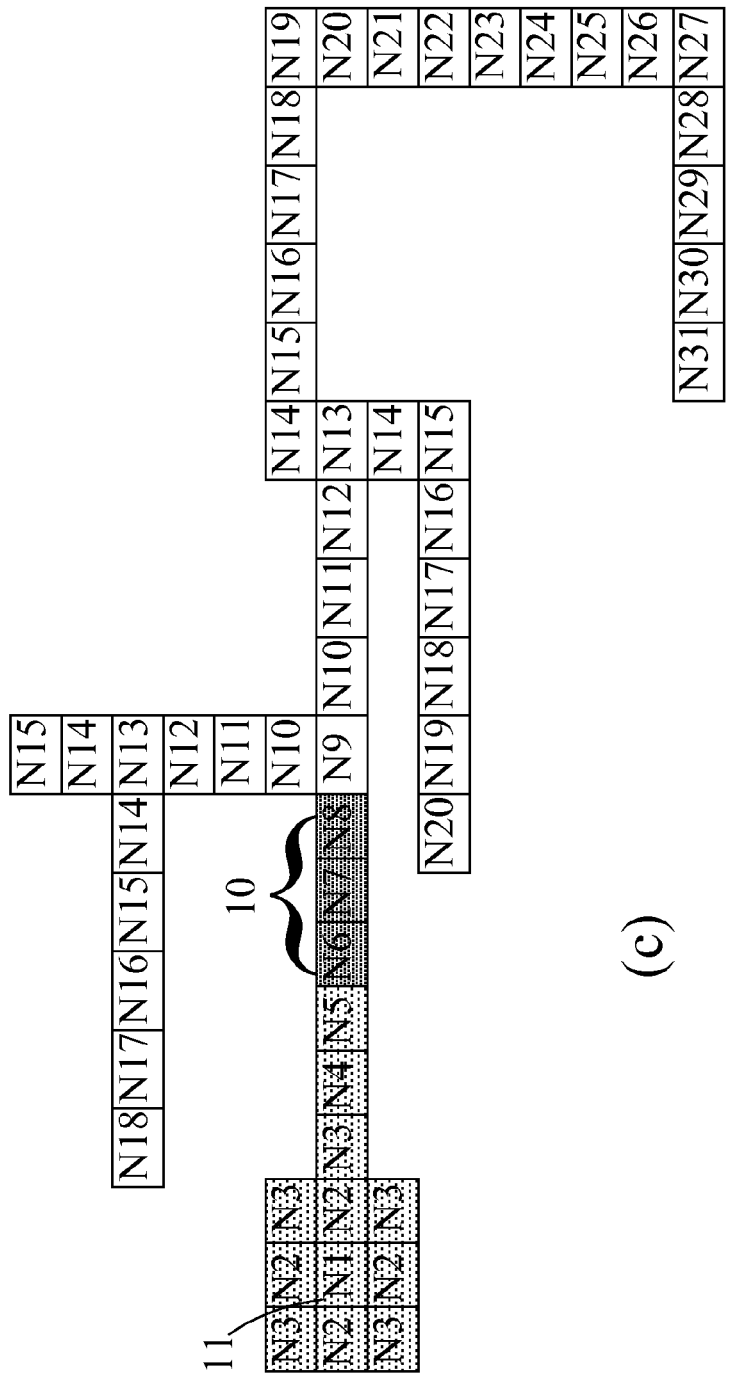
FIG. 11 is a third schematic view of a standard code tracking step and a step of determining a branch point of a characteristic element in accordance with the present invention.
Figure 12:
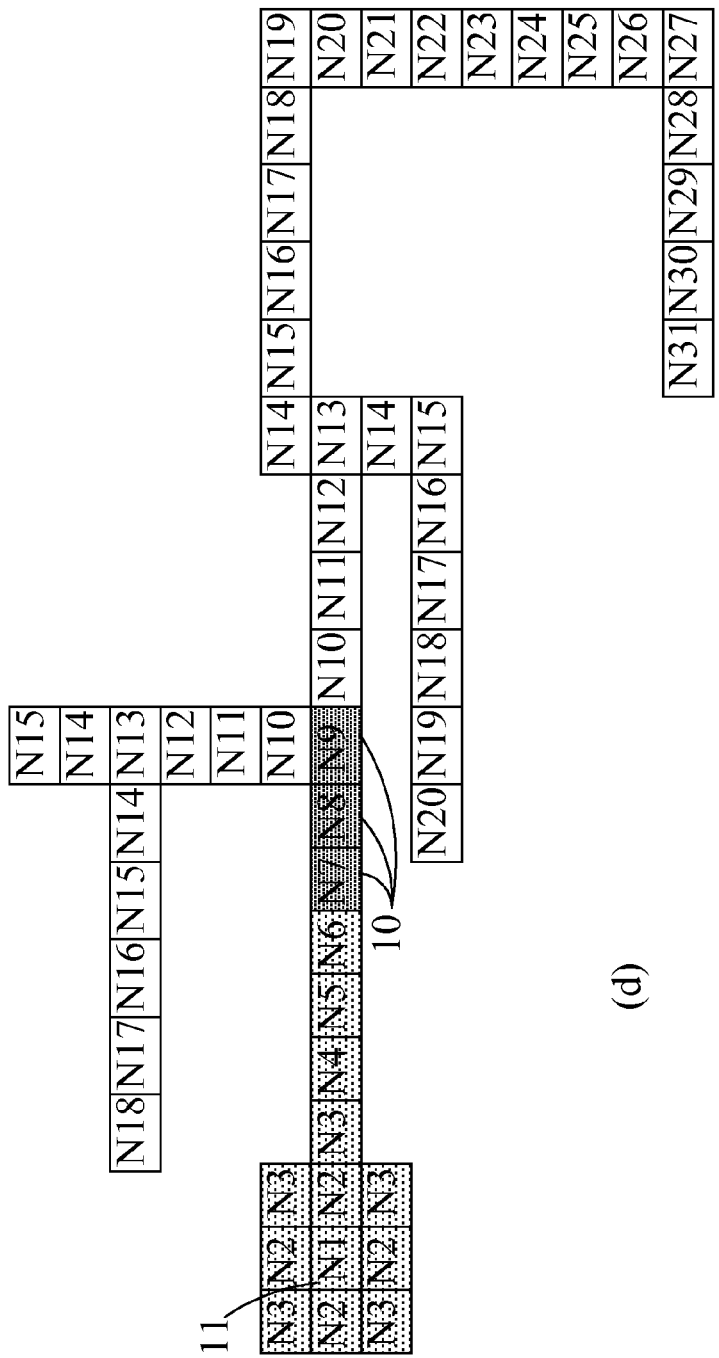
FIG. 12 is a fourth schematic view of a standard code tracking step and a step of determining a branch point of a characteristic element in accordance with the present invention.
Figure 13:
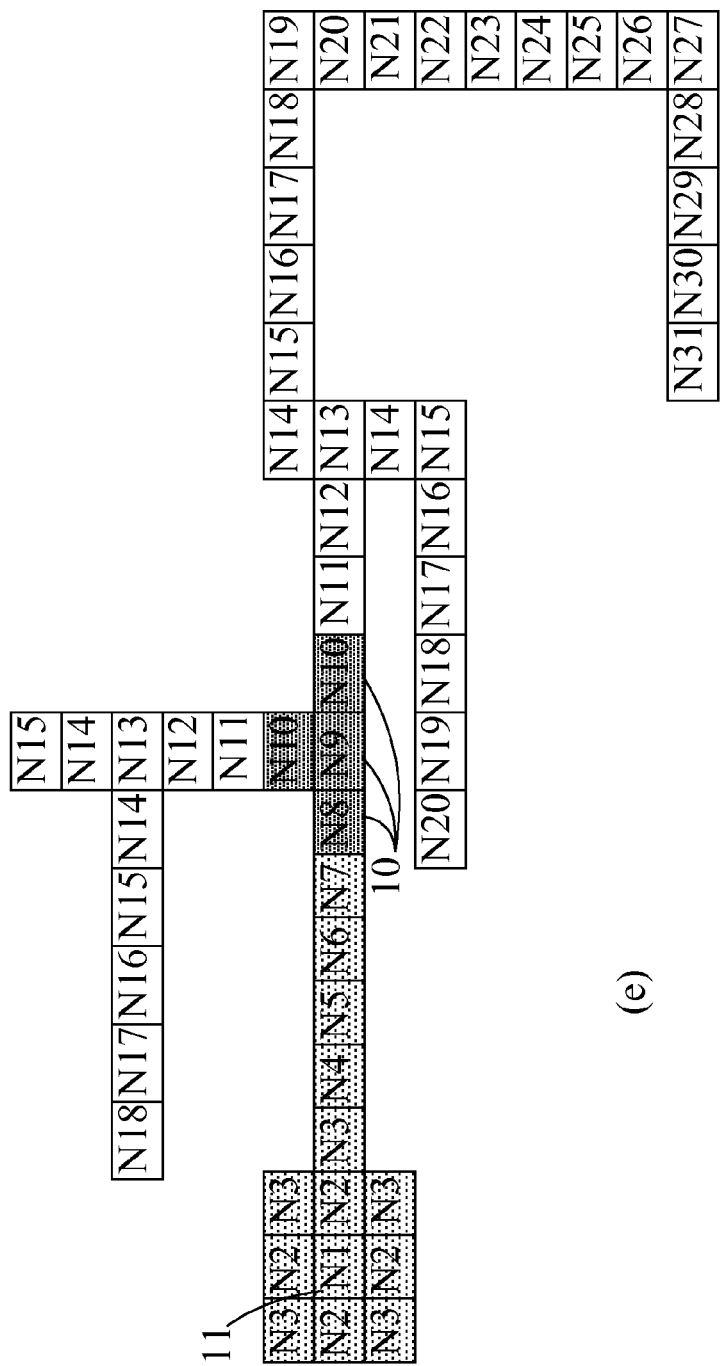
FIG. 13 is a fifth schematic view of a standard code tracking step and a step of determining a branch point of a characteristic element in accordance with the present invention.
Figure 14:
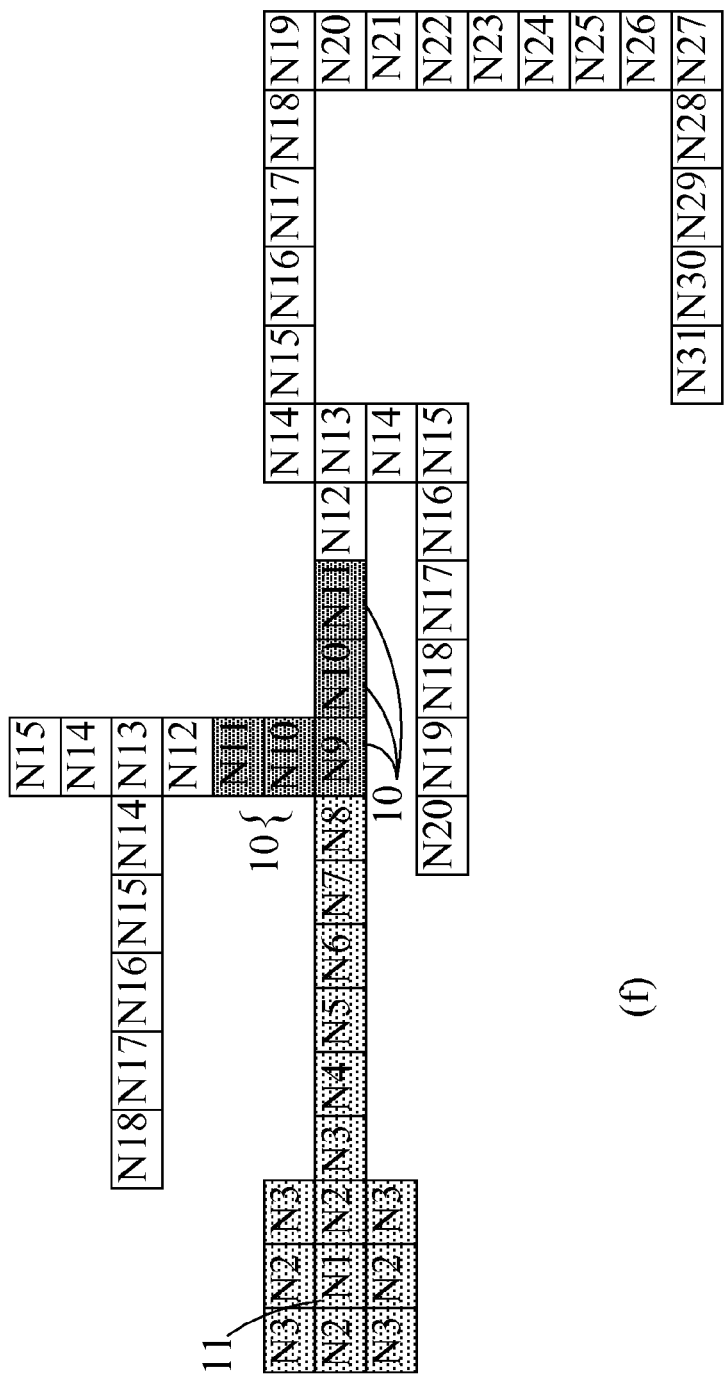
FIG. 14 is a sixth schematic view of a standard code tracking step and a step of determining a branch point of a characteristic element in accordance with the present invention.
Figure 15:
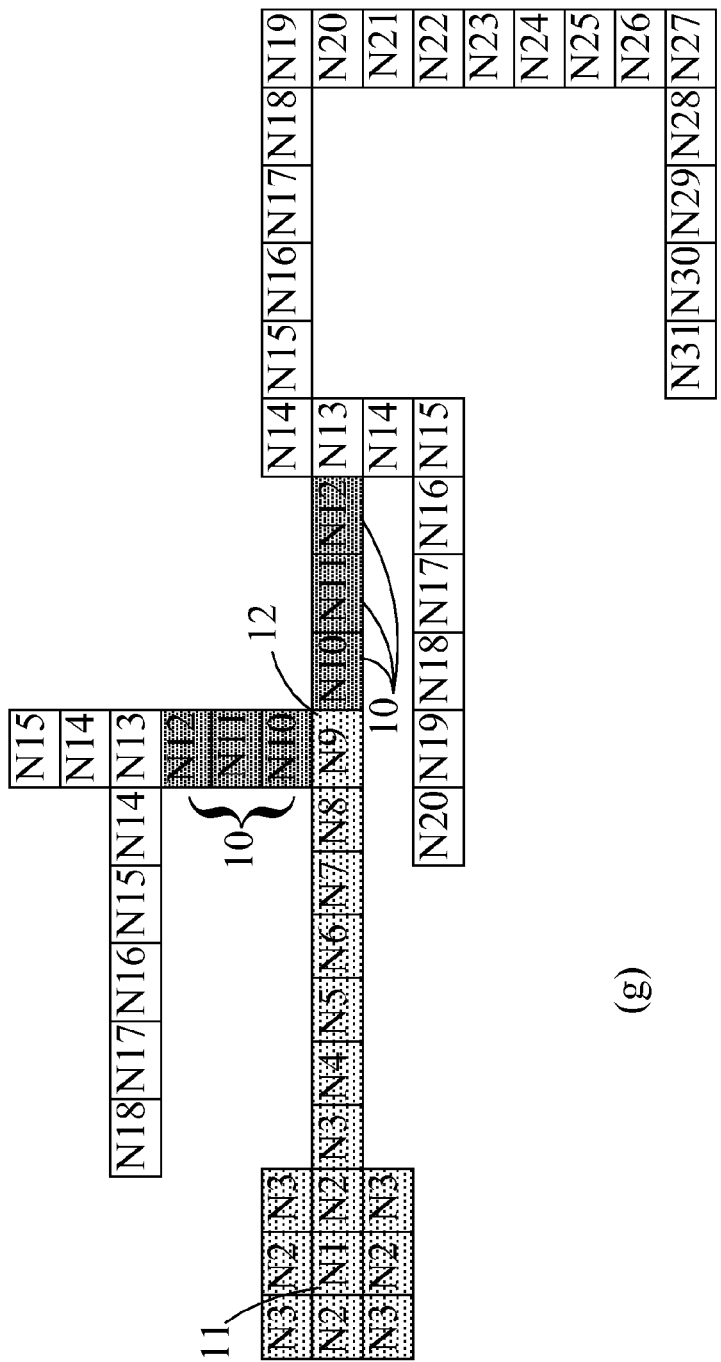
FIG. 15 is a seventh schematic view of a standard code tracking step and a step of determining a branch point of a characteristic element in accordance with the present invention.

With reference to FIG. 2 for a flow chart of an automatic tracing algorithm for a quantitative analysis of a 2D image of a continuous structure in accordance with the present invention, the algorithm comprises the steps of:

SS1: capturing a 2D image of a continuous structure and digitizing the 2D image such that the 2D image is comprised of a plurality of 2D pixels;

SS2: selecting any pixel of any edge of the 2D image as the starting point (SP) of FIG. 3 (wherein FIGS. 3 to 5 are schematic views of a portion of codes of the 2D image of a continuous structure provided for facilitating illustrating a portion of the 2D image), and assigning the starting point code of N1 to the starting point;

SS31: setting an intensity threshold Y with a gray scale brightness value of less than 100 and higher than 50 ($50 \leq Y \leq 100$) in the 2D image with a background color of a grayish black color having a gray scale value higher than 125 in order to capture the 2D image of the continuous structure, wherein the 2D image with this intensity threshold Y is the 2D image 1 before encoding; and encoding all pixels of the 2D image matched with the intensity threshold Y from the starting point N1 of the 2D image 1 before encoding by the source field encoding methodology, wherein a 2D image 2 is formed after the 2D image 1 before coding is encoded, and the source field encoding methodology comprises the following steps:

Assigning a pixel code to all pixels adjacent to the starting point N1 and matched with the intensity threshold Y, wherein the pixel code is incremented from the starting point code N1 by an integer such that the pixel adjacent to the starting point N1 has a pixel code of N2. In FIGS. 3 and 5, the pixel code of N2 is assigned to the pixel on the right hand side and adjacent to the starting point N1 and matched with the intensity threshold Y only. With reference to FIG. 4 for a schematic view of a portion of codes of a 2D image of a continuous structure, the encoding procedure by using the source field encoding methodology is illustrated by the following example, wherein any point of the 2D image 1 before coding is used as a starting point. In FIG. 4, any point at an edge is used as the starting point SP, and a starting point code of N1 is assigned to the starting point SP. Starting from the pixel code of N1, a pixel code of N2 is assigned to any pixel (including those situated on the right side and bottom side in the figure) situated in any direction adjacent to the starting point N1;

SS32: using the pixel code of N2 as the next starting point, and assigning a pixel code of N3 to each pixel adjacent to the pixel code of N2 and matched with the intensity threshold; and as shown in FIGS. 3 and 5, assigning the pixel code of N3 to a pixel on the right side adjacent to the pixel N2, and matched with the intensity threshold Y only; or as shown in FIG. 4, assigning the pixel code of N3 to three pixels in any direction adjacent to two pixel codes N2 starting from each pixel code N2 by a source field encoding methodology;

SS33: repeating the step SS32 until all pixels of the 2D image matched with the intensity threshold are encoded to form a 2D image 2 after coding; and as shown in FIG. 5, assigning a code of N10 to one of the two pixels adjacent to the pixel N10 and assigning a code of N11 to the other pixel in a different direction starting from the two pixel codes N10 respectively, wherein the encoding methods for the pixel code N14 and two pixel codes N15 are the same;

SS41: forming a tracing codelet 10 [Np+t−1, Np+t−2, . . . , Ng, . . . , Nt] by three or more connected pixels starting from the starting point N1 in any direction as shown in FIGS. 9 to 15, wherein the tracing codelet 10 has a length of p pixels, and a starting point at a pixel with a pixel code of Np+t−1, a center of mass at a pixel with a pixel code of Ncp, and an end point at a pixel with a pixel code of Nt; as shown in FIG. 9, a tracing codelet 10 is formed by three pixels (p=3), and the tracing codelet 10 calculated from the starting point N1 has t=1, and the tracing codelet 10 is [N3, N2, N1] and has a starting point of N3, a center of mass of N2 and an end point of N1;

SS42: tracing the tracing codelet 10, [Np+t−1, Np+t−2, . . . , Nt] in each direction from the starting point Np+t−1 of the tracing codelet 10 to the next pixel code by a source field encoding methodology; and the tracing codelet 10 is [N3, N2, N1] when it is traced from the pixel code N3 to the next pixel code N4;

SS43: using the next pixel code as a starting point (t=t+1) of the tracing codelet and repeating the step SS42 until all pixel codes of the 2D image are traced; and when the tracing codelet 10 [N3, N2, N1] is traced from the pixel code N3 to the pixel code N4, the tracing codelet 10 is [N4, N3, N2]; when it is traced for the fourth time as shown in FIG. 10, the tracing codelet 10 is [N6, N5, N4], and when it is traced for the sixth time as shown in FIG. 11, the tracing codelet 10 is [N8, N7, N6], and when it is traced for the seventh time as shown in FIG. 12, the tracing codelet 10 is [N9, N8, N7];

SS44: identifying each characteristic element in the 2D image, recording a pixel code at the position of the characteristic element of the continuous structure, and setting the center of mass of the tracing codelet 10 [Np+t−1, Np+t−2, . . . , Nt] to Ncp, such that when the tracing codelet 10 is traced, the starting point Np+t−1 of the tracing codelet 10 is divided into two or more pixels, and now, the characteristic element is a branch, and the branch point is situated at a voxel code equal to Ncp; for example, if the tracing codelet 10 is traced for the eighth time as shown in FIG. 13, the tracing codelet 10 is [N10, N9, N8], and now the starting point of the tracing codelet 10 is N10 and divided into two pixels, and the center of mass is N9, and the end point is N8; and now, the 2D image is determined to have a branch point 12, and the branch point 12 is situated at the center of mass of the tracing codelet 10 equal to Ncp (Ncp=N9); and if the tracing codelet 10 is traced for the ninth time as shown in FIG. 14, two tracing codelets 10 [N11, N10, N9] are formed; and if the tracing codelet 10 is tracked for the tenth time as shown in FIG. 15, two tracing codelets 10 [N12, N11, N10] continue tracing in different directions respectively.

Figure 16:
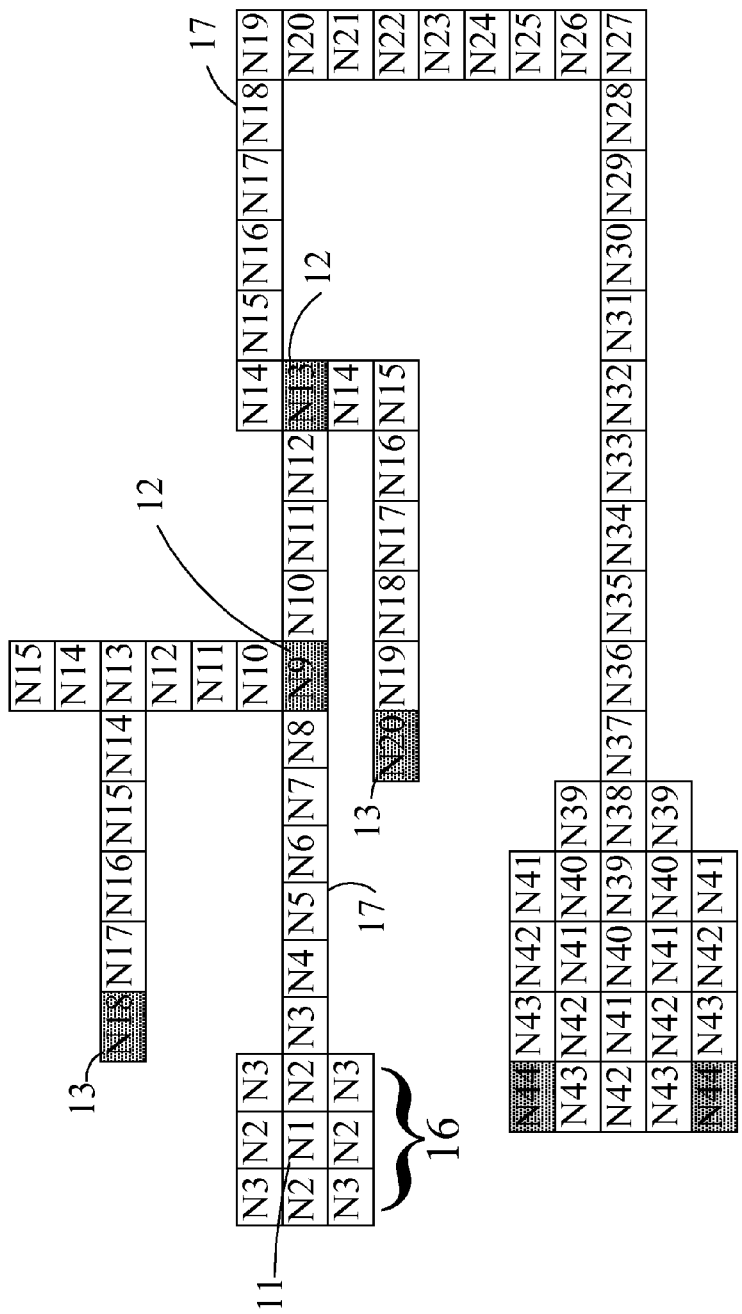
FIG. 16 is a schematic view of a step of determining a dead end of a characteristic element in accordance with the present invention.

In the tracing process, various types of characteristic elements can be identified as follows:

(1) If a tracing codelet 10 starts from a soma 16, there will be no pixel with a greater pixel code, so that the tracing can be continued. Now, the characteristic element is a dead end 13, and the dead end 13 is situated at the center of mass of the tracing codelet 10 equal to Ncp, which is called the end point (EP); as shown in FIG. 16, if the tracing codelet 10 reaches the pixel codes of N18 and N20 respectively, there will be no pixel with a greater pixel code, and thus the tracing can be continued. Now, the characteristic element is a dead end 13, and the dead end 13 is situated at the pixel codes of N17 (Ncp=N17) and N19 (Ncp=N19) which are EP.

Figure 17:
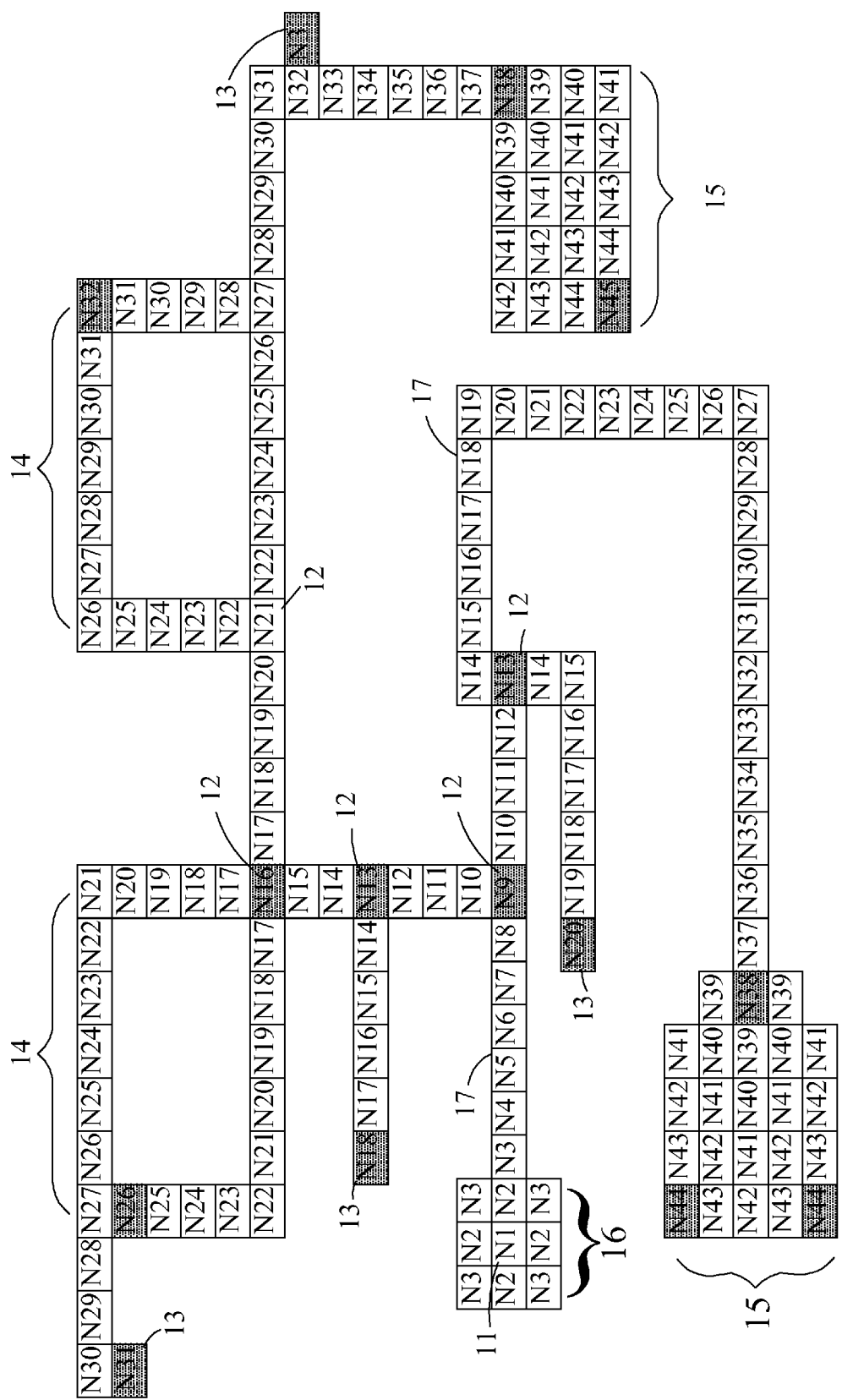
FIG. 17 is a schematic view of a step of determining a loop and a synapse of a characteristic element in accordance with the present invention.

(2) If the tracing codelet 10 reaches a traced pixel code, the characteristic element is a loop 14, and the loop 14 is situated at the center of mass of the tracing codelet 10 equal to Ncp; as shown in FIG. 17, if the tracing codelet 10 reaches the pixel codes of N27 and N32, the tracing codelet 10 has reached the traced pixel code. Now, the characteristic element is a loop 14, and the loop 14 is situated at the pixel codes of N26 (Ncp=N26) and N31 (Ncp=N31) respectively; and as shown in FIG. 17, two loops 14 are loops with an equal length (situated at N26) or loops with unequal lengths (situated at N31).

(3) When the tracing codelet 10 reaches an area of densely distributed pixel codes, the characteristic element is a synapse 15, and the synapse 15 is now situated at a position where the center of mass of the tracing codelet 10 is Ncp; as shown in FIG. 17, if the tracing codelet 10 reaches the pixel codes of N38 and N38 respectively, the tracing codelet 10 has reached the area of densely distributed pixel codes. Now, the characteristic element is a synapse 15, and the synapse 15 is situated at the pixel codes of N38 (Ncp=N38) and N38 (Ncp=N38).

(4) Any two characteristic elements are connected by a fiber 17; as shown in FIG. 17, the fiber is situated between a soma 16 and a branch 12 at a branch point N9, and the pixel codes are from N3 to N8; or as shown in FIG. 17, another segment of the fiber 17 is situated between a branch 12 at a branch point N13 and a synapse 15 with a pixel code of N38 and the pixel codes are from N13 to N38.

Figure 18:
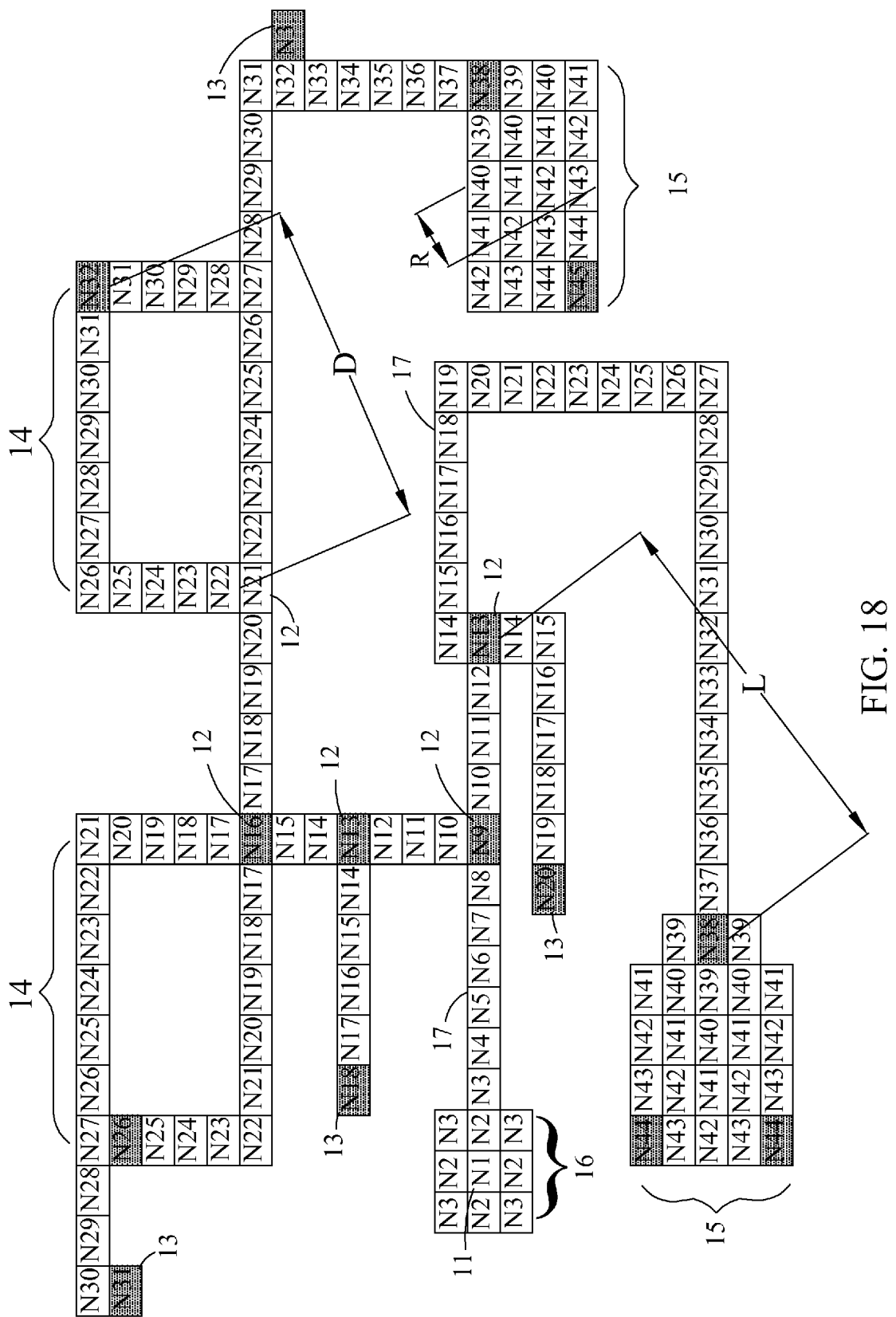
FIG. 18 is a schematic view of performing a quantitative analysis of voxel codes from the position of a characteristic element in accordance with the present invention.
Figure 19:
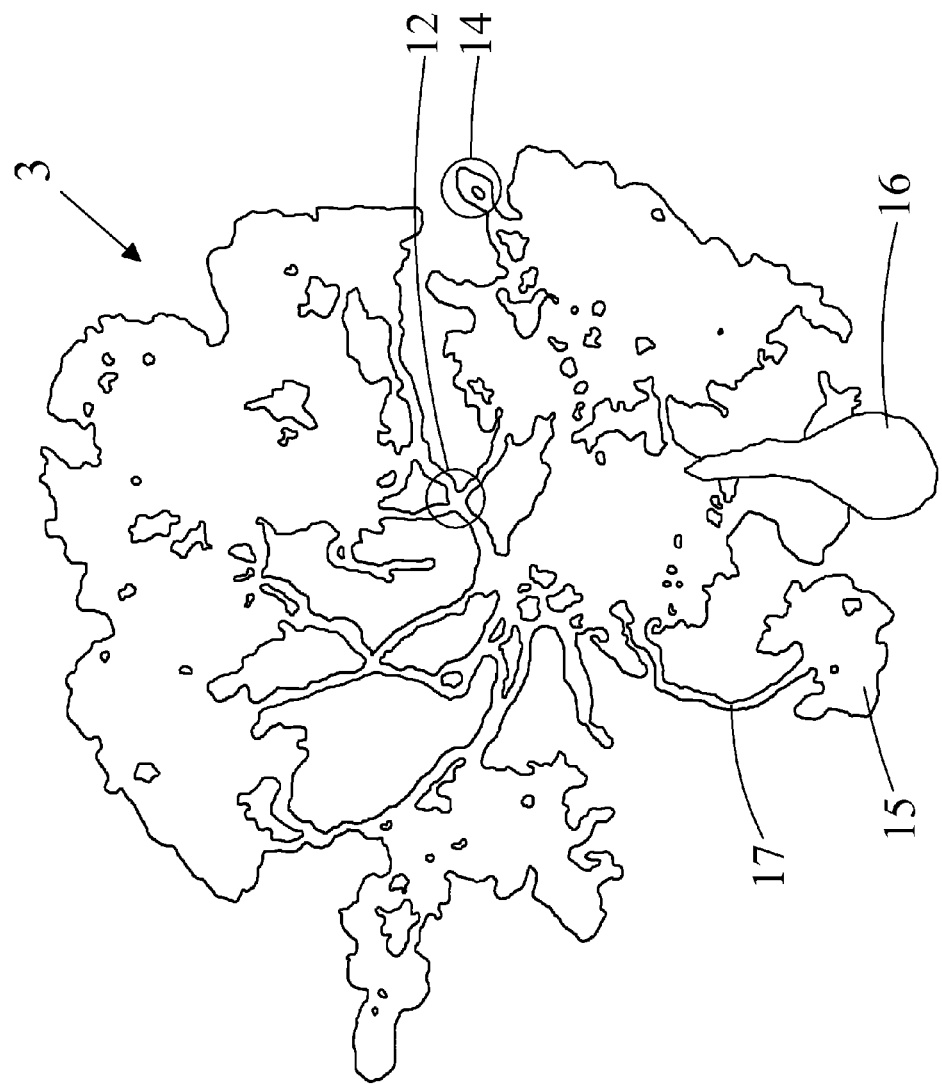
FIG. 19 shows a 2D image of a continuous structure of antennal lobe local neurons in *drosophila*.

SS5: performing a quantitative analysis for the voxel codes from the position of the characteristic element, and the quantitative analysis comprises the following computations:

(1) Computing the quantity of a characteristic element: After the tracking processes in the steps SS41~SS44 are performed, all characteristic elements can be identified, and the characteristic elements of the same sort can be used for computing the quantity of characteristic elements. In FIG. 18, four dead ends 13 of the characteristic elements, two loops 14 of the characteristic elements, two synapses 15 of the characteristic element, and four branches 12 of the characteristic elements can be computed.

(2) Computing the length of a characteristic element: After the tracing processes in the steps SS41~SS44 are performed, the positions of all characteristic elements can be determined, and the positions of two characteristic elements can be used for computing the length of a characteristic element.

The length of a characteristic element is computed by the following equation:

$$Lab = (|Na - Nb| + 1) \times \delta$$

where, Lab is the actual length (in μm) between pixel codes from Na to Nb of a characteristic element, and δ is the actual length of a pixel.

In FIG. 18, the 2D image is an image amplified by 1000 times, and each pixel has a size of 0.127 mm, which is the length of a fiber between a branch 12 with a pixel code of N13 and a synapse 15 with a pixel code of N38, and $$L = (|13 - 38| + 1) \times (0.127 \text{ mm}/1000) = 3.30 \text{ μm}$$

(3) Computing the cross-sectional width of a characteristic element: The cross-sectional width of a characteristic element can be computed by the pixel codes at both ends of a cross-section of the characteristic element cross-section;

In the cross-section of a synapse 15 as shown in the upper right corner of FIG. 18, the pixel codes are N40 to N43, and the cross-sectional width is equal to $$R = (|40-43|+1) \times (0.127 \text{ mm}/1000) = 0.508 \text{ μm}$$

In the diameter of a loop 14 as shown at the upper side of FIG. 18, the pixel codes are N21 to N32, and the diameter of the loop 14 is equal to $$D = (|21-32|+1) \times (0.127 \text{ mm}/1000)/\pi = 0.889 \text{ μm}$$

Computing the cross-sectional area of a characteristic element: The total number of pixels in a codelet of a characteristic element is divided by the length of the codelet is equal to the cross-sectional area of the characteristic element.

(4) Computing the center line moving direction of a characteristic element: Each pixel code in a characteristic element is connected from the minimum code to the maximum code is connected, and the connected pixel code constitutes the pixel code of the center line moving direction of the characteristic element.

(5) Computing the distance between any two characteristic elements in a continuous structure: Since any two characteristic elements of a continuous structure are connected directly or are connected through another characteristic element, and thus the distance between two directly connected characteristic element can be computed by the positions of the two characteristic elements, and the distance of two characteristic elements connected by another characteristic element in a continuous structure can be the maximum pixel code and the minimum pixel code of a center line between the characteristic elements.

(6) Computing the angle of relative positions of any two characteristic elements: After the moving direction of center line is obtained, the tangent vector of any position (or pixel) on the center line can be computed, and the angle of relative position of any two characteristic elements can be obtained by the inner product of the corresponding tangent vectors.

To further simplify the pixel code of the 2D image, the automatic tracing algorithm for a quantitative analysis of continuous structures in accordance with the present invention filters the 2D image by an intensity threshold and capture the pixels of the 2D image within the range of the intensity threshold in the steps SS1 and SS3 so as to further reduce and simplify the process of encoding the 2D image as described below:

SS1': digitizing the 2D image, setting an intensity threshold of the 2D image and filtering the intensity threshold of the 2D image such that the filtered 2D image is comprised of pixels; for example, the intensity threshold Y has a gray scale brightness value less than 100 and greater than 50 ($50 \leq Y \leq 100$), such that the intensity of each pixel falls within the range of the intensity threshold, and unnecessary pixels in the 2D image are filtered;

SS2': selecting a starting point SP and assigning a starting point code N1 to the starting point SP as shown in FIGS. 3~5;

SS31': assigning a pixel code to the pixel adjacent to the starting point N1 by a source field encoding methodology, and incrementing the starting point code N1 by an integer to N2;

SS32': using a pixel with a pixel code of N2 as the next starting point and assigning a pixel code of N3 to each pixel in any direction adjacent to the pixel code N2 by the source field encoding methodology;

SS33': repeating the step SS32' until all pixels of the 2D image are encoded;

The step SS4 (S541~S544) and SS5 are the same as described above and thus will not be described here again.

Figure 6:
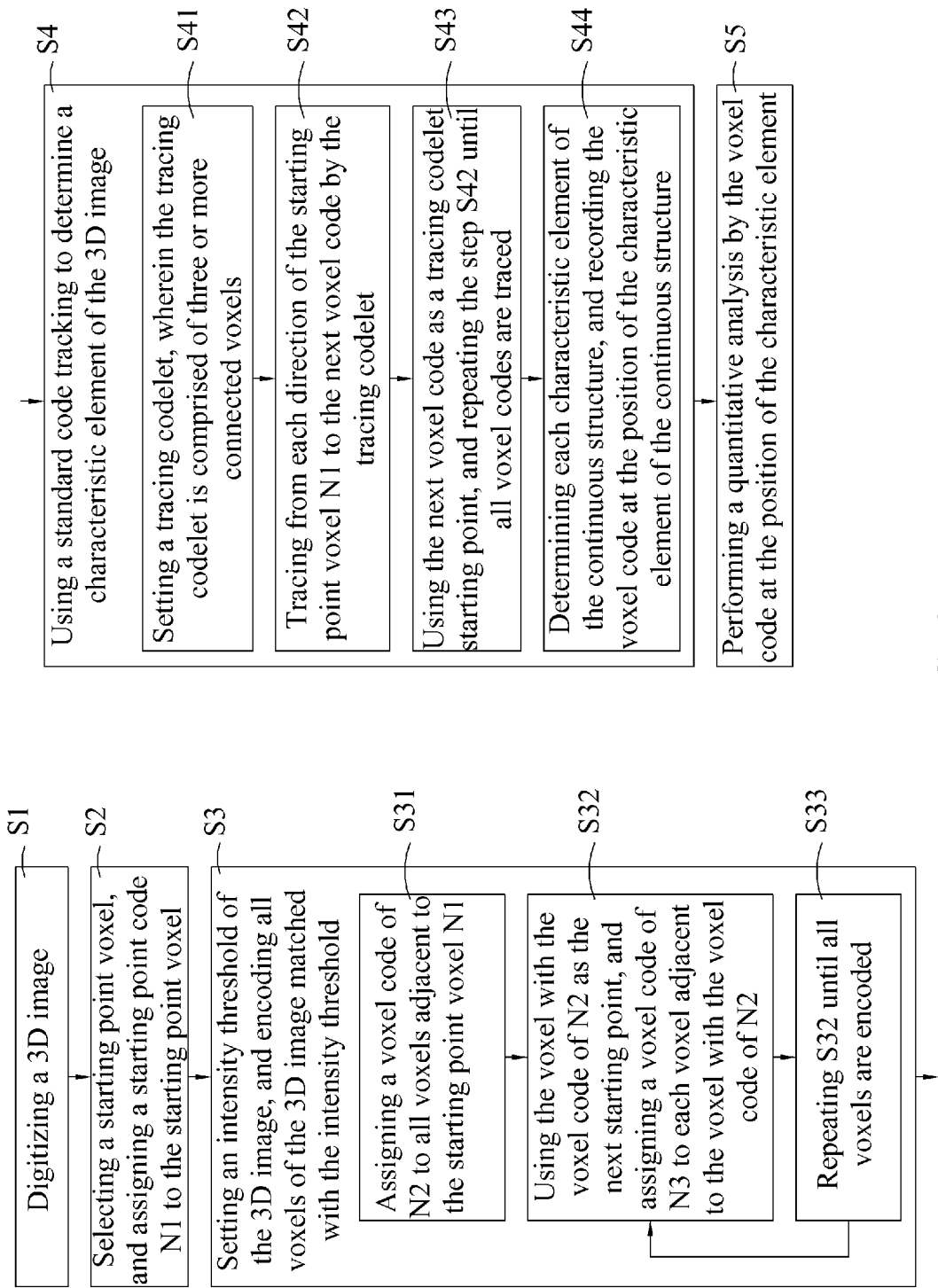
FIG. 6 is a flow chart of an automatic tracing algorithm for a quantitative analysis of continuous structures.
Figure 7:
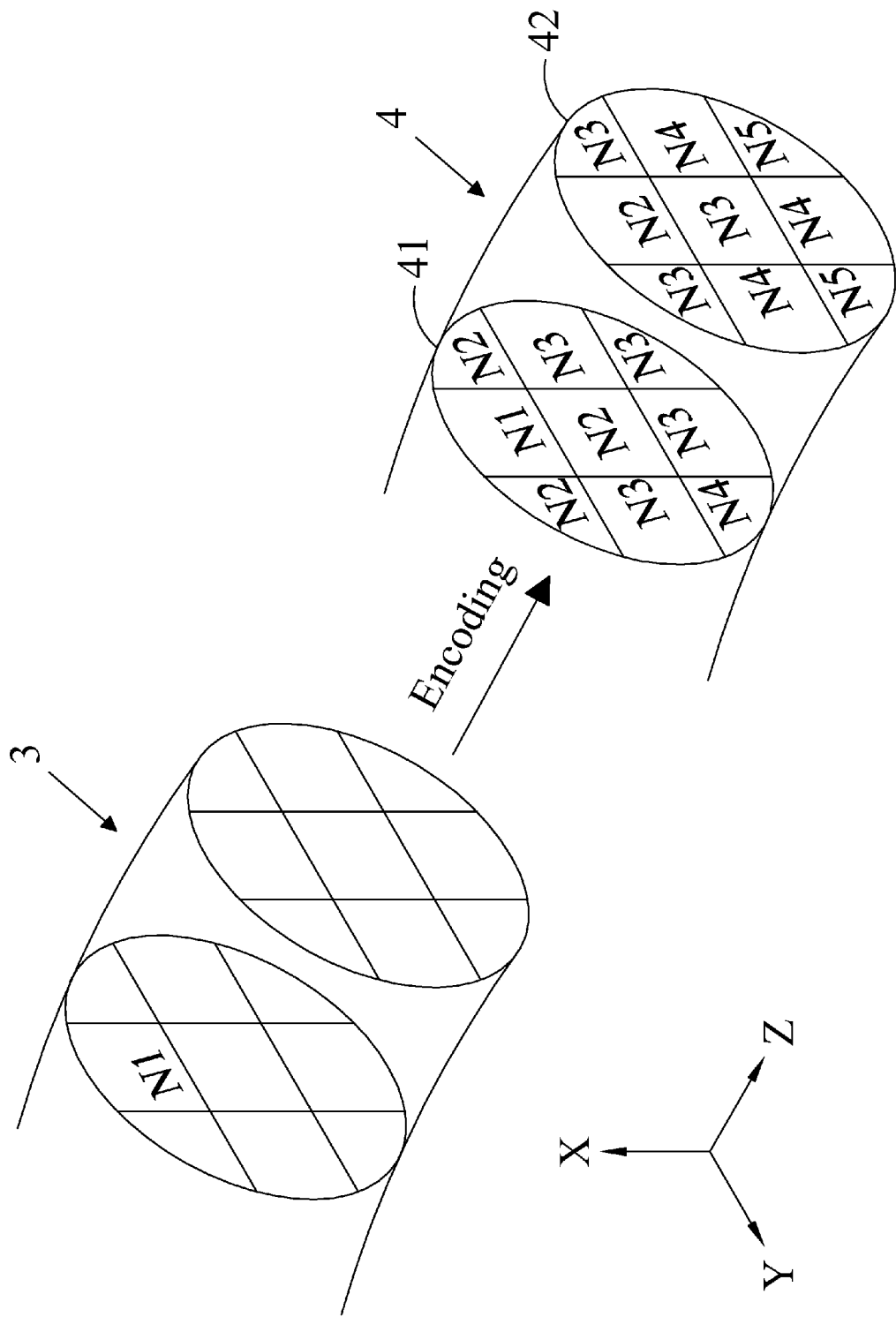
FIG. 7 is a first schematic view of an automatic tracing algorithm for a quantitative analysis of continuous structures in 3D image codes in accordance with the present invention.
Figure 8:
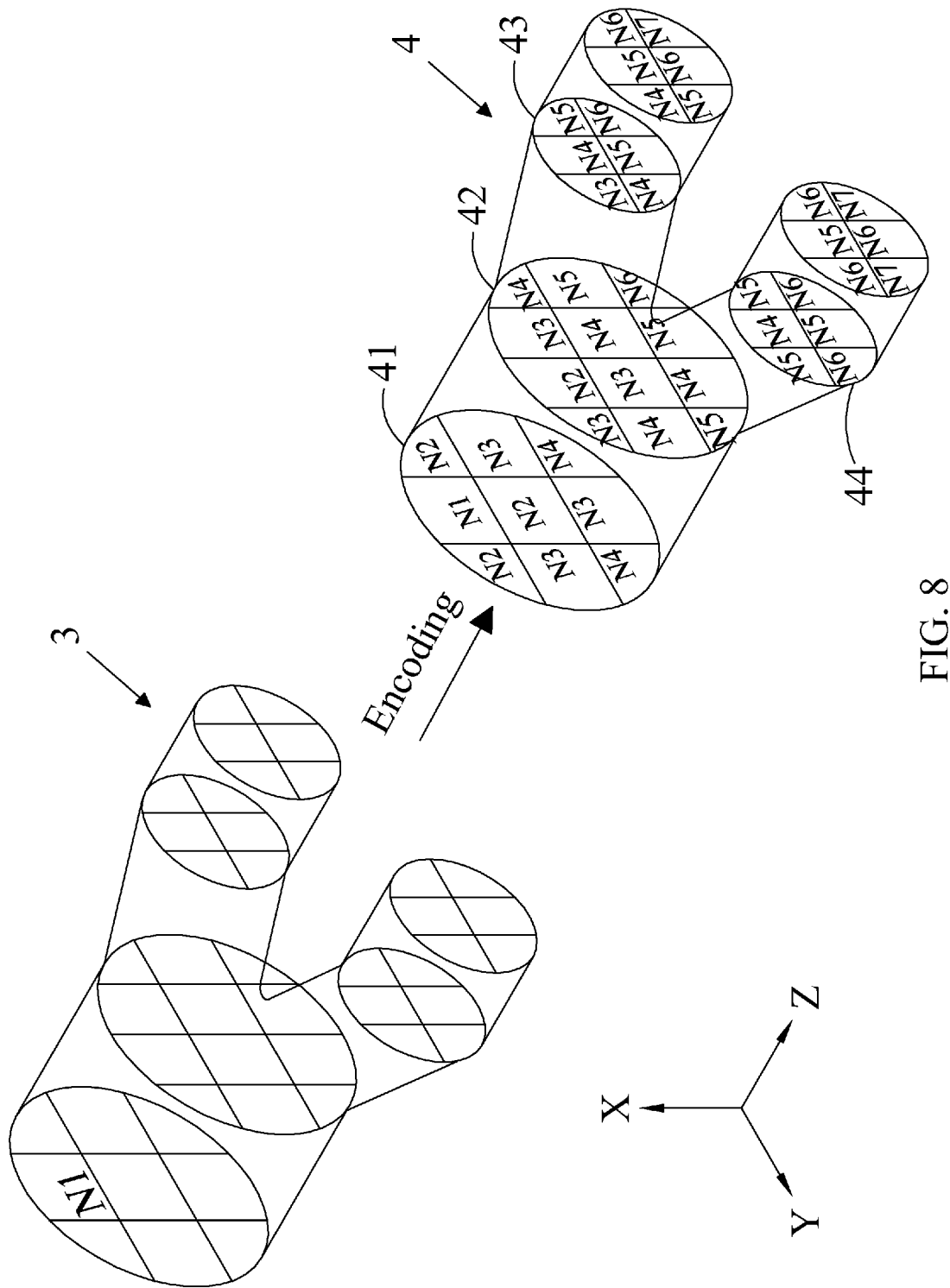
FIG. 8 is a second schematic view of an automatic tracing algorithm for a quantitative analysis of continuous structures in 3D image codes in accordance with the present invention.

With reference to FIG. 6 for a 3D image of a continuous structure, an automatic tracing algorithm for a quantitative analysis of the continuous structure in accordance with the present invention comprises the steps of:

S1: capturing a 3D image of a continuous structure and digitizing the 3D image such that the 3D image is comprised of three-dimensional voxels;

S2: with reference to FIGS. 7 and 8 for schematic views of a portion of codes of a 3D image of a continuous structure (only a portion of 3D image is shown for the purpose of illustrating the present invention); as shown in FIG. 7, selecting any voxel at any edge of the 3D image as a starting point (SP), and assigning a voxel code of N2 to the starting point;

S31: setting an intensity threshold Y to capture a 3D image of a continuous structure, wherein the 3D image with a background color of a grayish black color having a gray scale value higher than 125, and using this intensity threshold Y for encoding the 3D image 3 before encoding; and encoding all voxels starting from the starting point voxel N1 of the 3D image 3 before coding and matched with the intensity threshold Y by using a source field encoding methodology to form a 3D image 4 after encoding, wherein the source field encoding methodology comprises the steps of:

assigning a voxel code to all voxels adjacent to the starting point voxel N1 and matched with the intensity threshold Y, wherein the voxel code is incremented from the starting point code N1 by an integer, such that the voxel code of the voxel adjacent to the starting point voxel N1 is N2; as shown in FIG. 7, assigning a voxel code of N2 to three voxels in the X-Y plane direction on a first cross-section 41 of the 3D image and adjacent to the starting point voxel N1, and matched with the intensity threshold Y, and assigning a voxel code of N2 to one voxel in the Z-axis direction and matched with the intensity threshold Y;

S32: using the voxel code of N2 as the next starting point, and encoding each voxel in X-Y-Z-axis directions adjacent to the voxel code of N2 and matched with the intensity threshold by a source field encoding methodology, and assigning a voxel code of N3 to each voxel; as shown in FIG. 7, assigning a voxel code of N3 to the three voxels in the X-Y direction and adjacent to the voxel N2 and matched with the intensity threshold Y, and assigning a voxel code of N3 to three voxels in the Z-axis direction;

S33: repeating the step S32 until all voxels of the 3D image matched with the intensity threshold are encoded to form a 3D image 4 after encoding; as shown in FIG. 8, assigning a code of N3 to three voxels on a second cross-section 42 of a 3D image of a branch and in a X-Y direction adjacent to the voxel N2; assigning a code of N3 to a voxel on a third cross-section 43 of a branch and in a Z-axis direction adjacent to a second cross-section 42 of the voxel with a voxel code of N2; assigning a code of N5 to a voxel on a branched fourth cross-section 44 in a Z-axis direction, and adjacent to the voxel on the second cross-section 42 and with a voxel code of N4; and applying this method to assign the code to each voxel of the third cross-section 43 and encoding each of the branched voxels, and encoding each voxel of the fourth cross-section 44, and encoding each branched voxel;

S41: forming the tracing codelet 10 [Np+t−1, Np+t−2, . . . , Ng, . . . , Nt] by three or more connected voxels in the X-Y direction and Z direction of the starting point voxel N1, wherein the tracing codelet 10 has a length of p voxels; and the starting point of the tracing codelet 10s is the voxel with a voxel code Np+t−1, and the center of mass of the tracing codelet 10 is a voxel with a voxel code Ncp, and the end point is a voxel with a voxel code Nt;

S42: tracing the tracing codelet 10, [Np+t−1, Np+t−2, . . . , Nt] starting from the starting point Np+t−1 of the tracing codelet 10 in each direction to the next voxel code by the source field encoding methodology;

S43: using the next voxel code as a starting point (t=t+1) of the tracing codelet and repeating the step S42 until all voxel codes of the 3D image are traced;

S44: identifying each characteristic element in the 3D image, record the voxel code at the position of the characteristic element of the continuous structure, and set the center of mass of the tracing codelet 10 [Np+t−1, Np+t−2, . . . , Nt] as Ncp. In a tracing process, the starting point Np+t−1 of the tracing codelet 10 is divided into two or more voxels. Now, the characteristic element is a branch, and the branch point is situated at the voxel code Ncp. In the tracing process, each different type of characteristic elements can be identified, and its method is the same as that for the 2D image, and thus will not be described here again;

S5: using the voxel code at the position of the characteristic element for the quantitative analysis, wherein the quantitative analysis includes the computation of the quantity, length, cross-sectional width, surface area, cross-sectional area, volume, and center line moving direction of a characteristic element, and a distance of any two characteristic elements and an angle of relative positions of any two characteristic elements in a continuous structure, and the computation method is similar to the quantified method of 2D images, and thus will not be described here again.

To further reduce and simplify the voxel codes of the 3D image, the automatic tracing algorithm for a quantitative analysis of continuous structures in accordance with the present invention can filter the 3D image by an intensity threshold first, and then capture voxels of the 3D image within the range of the intensity threshold in the steps S1 and S3 so as to simplify the process of encoding the 3D image.

S1': Digitizing a 3D image, setting an intensity threshold of the 3D image, and filtering the 3D image by the intensity threshold, such that the filtered 3D image is comprised of voxels, wherein the intensity of each voxel falls within the range of the intensity threshold, and the unnecessary voxels of the 3D image are filtered.

S2': Selecting a starting point voxel SP, and assigning a starting point code N1 to the starting point voxel SP, similar to FIGS. 7 and 8.

S31': Using the source field encoding methodology to assign a voxel code to the voxel adjacent to the starting point voxel N1, wherein the voxel code is incremented from the starting point code N1 by an integer to N2.

S32': Using the pixel with a voxel code of N2 as the next starting point, and using the source field encoding methodology to assign a voxel code of N3 to each voxel in any direction adjacent to the voxel code N2.

S33': Repeating the step S32' until all voxels of the 3D image are en coded.

As to the steps S4 (S41~S44) and S5 are the same as described above, and thus will not be described here again.

Figure 22:
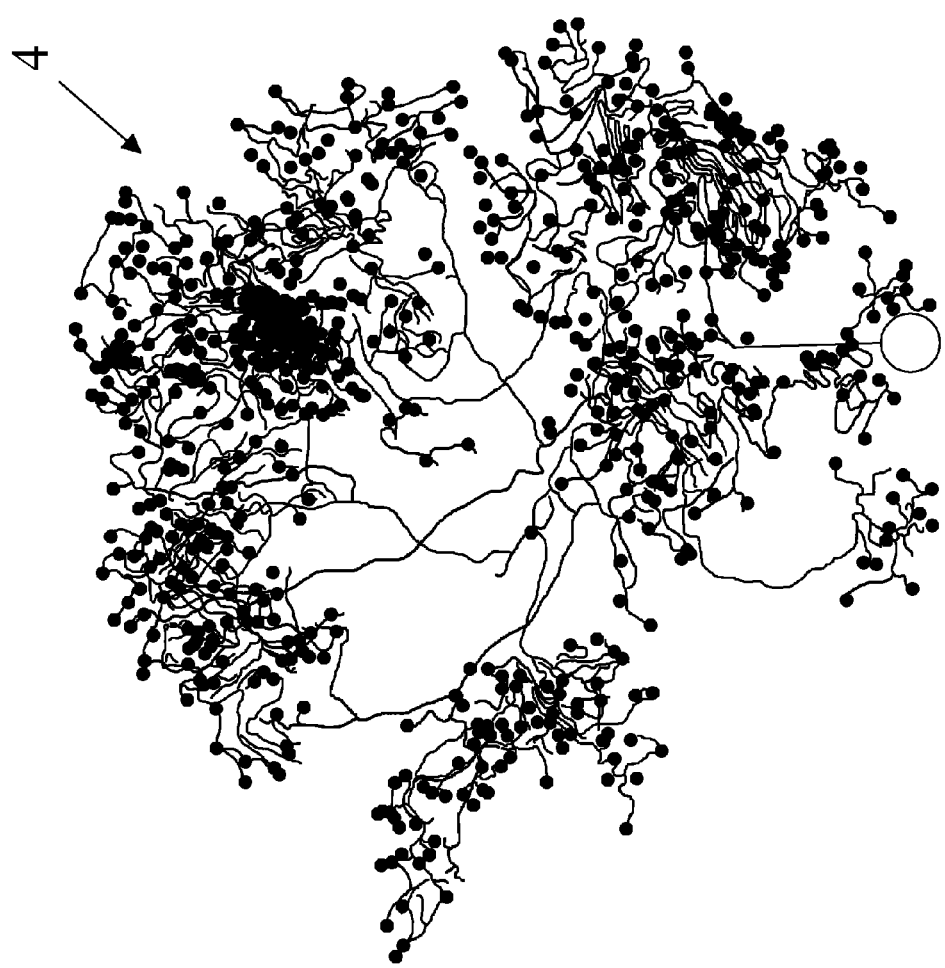
FIG. 22 is a schematic view of a dead end displayed after an automatic tracing algorithm for a quantitative analysis of the present invention applied to a continuous structure of antennal lobe local neurons in *drosophila*.
Figure 23:
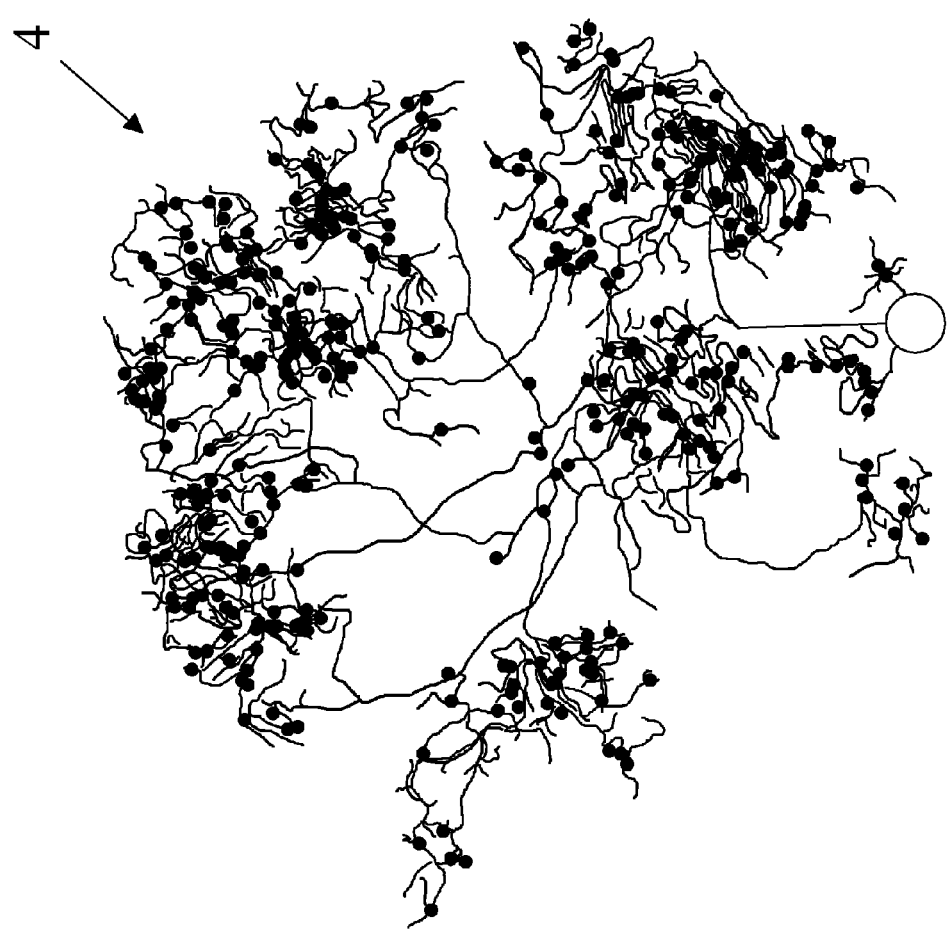
FIG. 23 is a schematic view of a loop displayed after an automatic tracing algorithm for a quantitative analysis of the present invention applied to a continuous structure of antennal lobe local neurons in *drosophila*.
Figure 24:
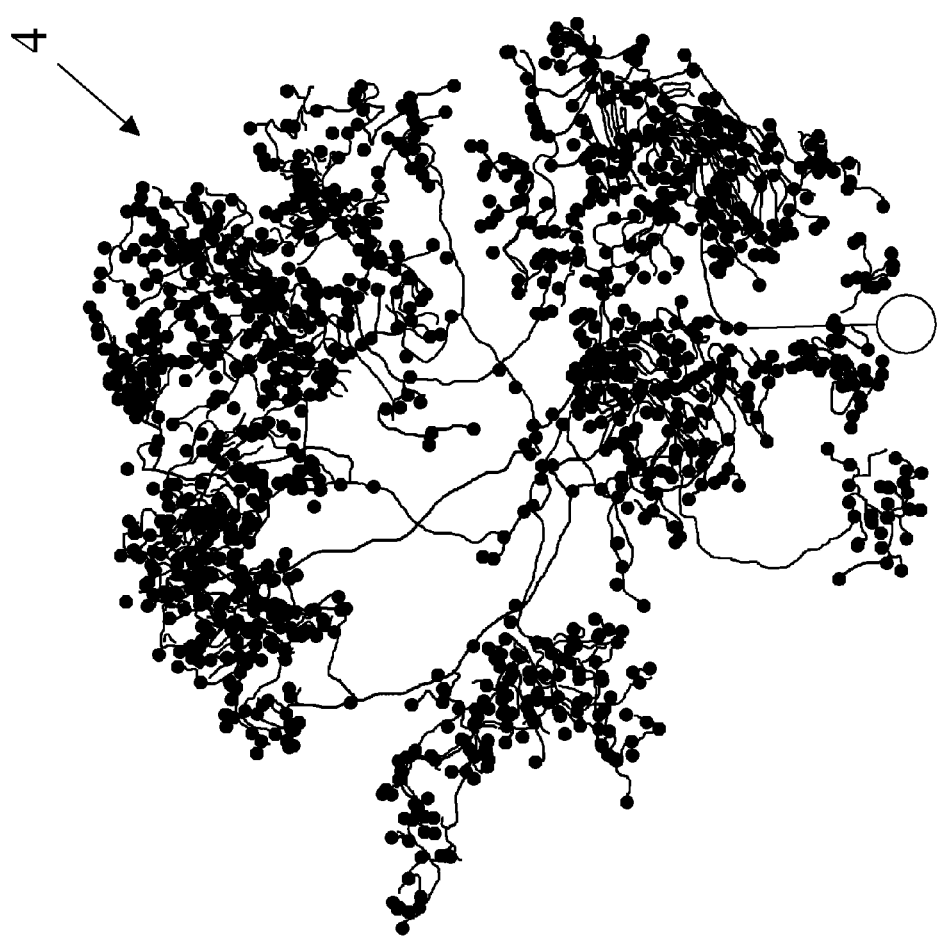
FIG. 24 is a schematic view of a result obtained by an automatic tracing algorithm for a quantitative analysis of the present invention applied to a continuous structure of antennal lobe local neurons in *drosophila*.

With reference to FIGS. 19 to 24 for an automatic tracing algorithm for a quantitative analysis of continuous structures applied to a 3D image of a continuous structure of antennal lobe local neurons in *drosophila* in accordance with a preferred embodiment of the present invention, a very small tissue sample can be obtained by a 3D confocal microscope, a 3D OCT confocal imaging apparatus, a 3D X-ray microscope or a 3D tunneling microscopy, but not limited to such arrangements only. In this preferred embodiment, the 3D confocal microscope is used for obtaining the 3D image of antennal lobe local neurons in *drosophila* as shown in FIG. 24.

Figure 20:
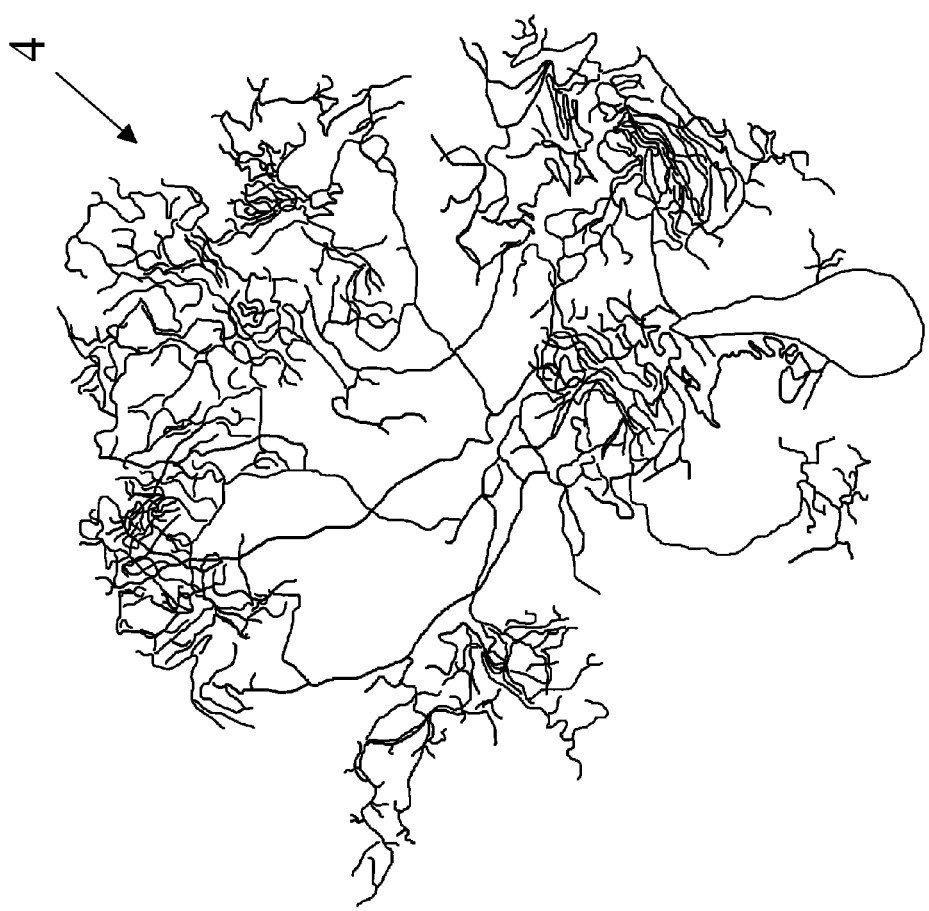
FIG. 20 is a schematic view of a neural fiber displayed after an automatic tracing algorithm for a quantitative analysis of the present invention applied to a continuous structure of antennal lobe local neurons in *drosophila*.
Figure 21:
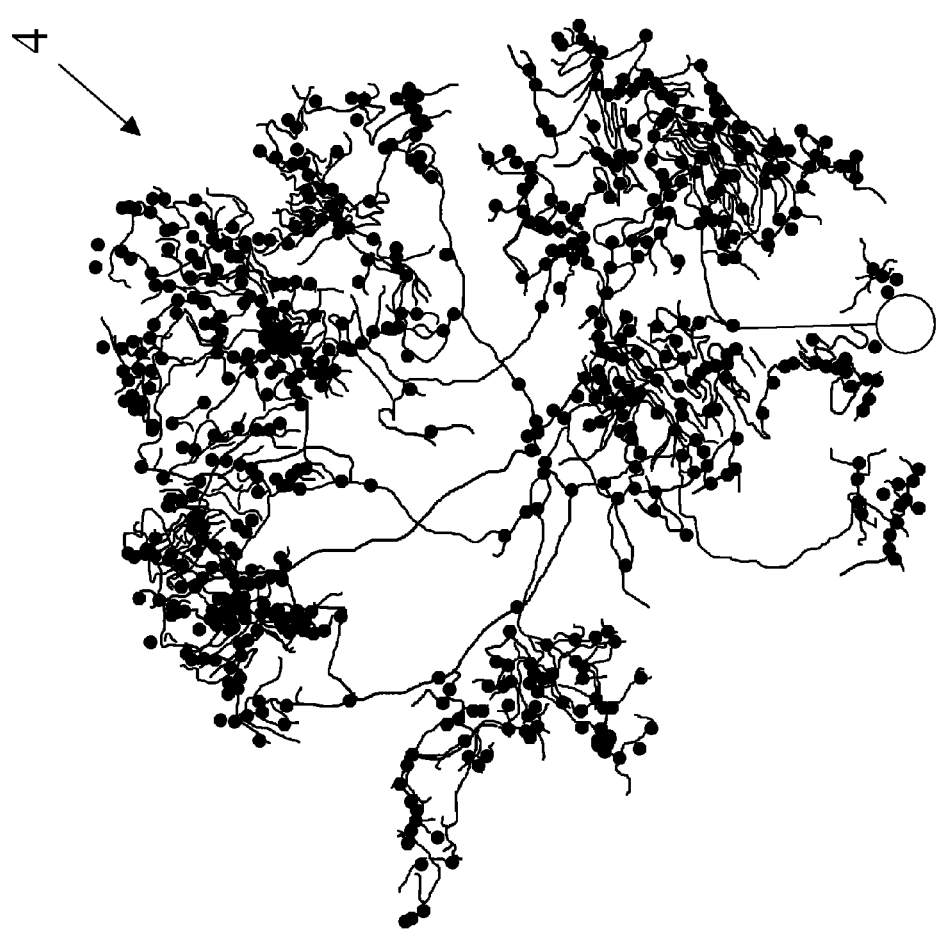
FIG. 21 is a schematic view of a branch point displayed after an automatic tracing algorithm for a quantitative analysis of the present invention applied to a continuous structure of antennal lobe local neurons in *drosophila*.

In FIG. 24, the antennal lobe local neurons in *drosophila* are a continuous structure, and the 3D image 3 is an image of a plurality of somas 16, synapses 15, loops 14, fibers 17 and branches 12. If a gray scale below 90 is the intensity threshold, and after the automatic tracing of the tracing codelet 10 is processed by one pixel code and three voxel codes as shown in FIG. 18, and the tracing codelet 10 is traced, each characteristic element can be identified to determine that the characteristic element is a fiber 17 (as shown in FIG. 20), the characteristic element is a branch 12 (as shown in FIG. 21, and the position of the branch 12 is represented by a circular dot), the characteristic element is a dead end 13 (as shown in FIG. 22, and the position of the dead end 13 is represented by a circular dot), or the characteristic element is a loop 14 (as shown in FIG. 23, and the loop 14 is represented by a circular dot). The quantity, length, cross-sectional width, surface area, cross-sectional area, volume, center line moving direction of a characteristic element, and the distance between any two characteristic elements, and the angle of relative positions of any two characteristic elements can be analyzed quantitatively.

While the invention has been described by means of specific embodiments, numerous modifications and variations could be made thereto by those skilled in the art without departing from the scope and spirit of the invention set forth in the claims.

What is claimed is:

1. A computer-implemented automatic tracing algorithm for a quantitative analysis of continuous structures, applied for analyzing a 3D image of the continuous structures, and each the continuous structure having at least one characteristic element, and the algorithm comprising the steps of:

S1: capturing the 3D image of the continuous structure and digitizing the 3D image such that the 3D image is comprised of a plurality of voxels;

S2: selecting a starting point voxel and assigning a starting point code N1 to the starting point voxel, wherein the starting point voxel is selected from any voxel of the 3D image;

S3: setting an intensity threshold of the 3D image, and starting with the starting point voxel to encode all the voxels of the 3D image that match with the intensity threshold, and the step S3 further comprising the steps of:

S31: assigning a voxel code to all the voxels adjacent to the starting point voxel N1 and matched with the intensity threshold, and the voxel code being incremented from the starting point code N1 by an integer to N2;

S32: using the voxel with a voxel code of N2 as an adjacent starting point, and assigning a voxel code of N3 to each the voxel adjacent to the voxel with the voxel code of N2 and matched with the intensity threshold; and S33: repeating S32 until all the voxels of the 3D image matched with the intensity threshold are encoded; and S4: using a standard code tracking to identify the characteristic element of the 3D image, and the standard code tracking comprising the steps of:

S41: setting a tracing codelet (Np+t−1, Np+t−2, . . . , Nt), wherein the tracing codelet is comprised of the three or more connected voxels, the tracing codelet has a length of p voxels, a starting point at a voxel with a voxel code of Np+t−1, an end point at a voxel with a voxel code of Nt, and an integer t starts at 1 and increases as a tracing progress;

S42: tracing by the tracing codelet from each direction of the starting point voxel N1 to the adjacent voxel code by using a source field encoding methodology;

S43: using the adjacent voxel code as a tracing codelet starting point and repeating the step S42 until all the voxel codes of the 3D image are traced; and S44: determining each the characteristic element in the 3D image of the continuous structure, and recording the voxel code at the position of the characteristic element of the continuous structure.

2. The computer-implemented automatic tracing algorithm for a quantitative analysis of continuous structures as recited in claim 1, further comprising the step of:

S5: performing a quantitative analysis by the voxel code at the position of the characteristic element, and the quantitative analysis comprising one or a combination of the computations selected from the collection of computing the quantity of the characteristic elements, computing the lengths of the characteristic elements, computing the cross-sectional widths of the characteristic elements, computing the surface areas of the characteristic elements, computing the cross-sectional areas of the characteristic elements, computing the volumes of the characteristic elements, computing the center line trends of the characteristic elements, computing a distance between any two characteristic elements of the continuous structure, and computing an angle of relative positions of any two characteristic elements.

3. The computer-implemented automatic tracing algorithm for a quantitative analysis of continuous structures as recited in claim 1, wherein the starting point voxel as described in the step S2 is one selected from the collection of any voxel at any edge of the 3D image and any voxel at any central area of any characteristic element.

4. The computer-implemented automatic tracing algorithm for a quantitative analysis of continuous structures as recited in claim 1, wherein the intensity threshold of the 3D image as described in the step S3 is set by one or a combination of factors selected from the collection of the quality, noise condition, selected color and selected gray scale of the 3D image.

5. A computer-implemented automatic tracing algorithm for a quantitative analysis of continuous structures, applied for analyzing a 3D image of the continuous structures, and each the continuous structure having at least one characteristic element, and the algorithm comprising the steps of:

S1': capturing the 3D image of the continuous structure, digitizing the 3D image, setting an intensity threshold of the 3D image, and filtering the 3D image by the intensity threshold, such that the filtered 3D image is comprised of a plurality of voxels;

S2': selecting a starting point voxel, assigning a starting point code N1 to the starting point voxel, wherein the starting point voxel is selected from any voxel of the 3D image;

S3': encoding all the voxels of the 3D image, and the step S3' comprising the steps of:

S31': assigning a voxel code to all the voxels of the starting point voxel N1, wherein the voxel code is incremented from the starting point code N1 by an integer to N2;

S32': using the voxel with a voxel code of N2 as an adjacent starting point, and assigning a voxel code of N3 to each the voxel adjacent to the voxel with the voxel code of N2; and S33': repeating the step S32 until all the voxels of the 3D image are encoded; and S4: using a standard code tracking to identify the characteristic element of the 3D image, and the standard code tracking comprising the steps of:

S41: setting a tracing codelet (Np+t−1, Np+t−2, . . . , Nt), wherein the tracing codelet is comprised of the three or more connected voxels, the tracing codelet has a length of p voxels, a starting point at a voxel with a voxel code of Np+t−1, an end point at a voxel with a voxel code of Nt, and an integer t starts at 1 and increases as a tracing progress;

S42: tracing by the tracing codelet from each direction of the starting point voxel N1 to the adjacent voxel code by using a source field encoding methodology;

S43: using the adjacent voxel code as a tracing codelet starting point and repeating the step S42 until all the voxel codes of the 3D image are traced; and S44: determining each the characteristic element in the 3D image of the continuous structure, and recording the voxel code at the position of the characteristic element of the continuous structure.

6. The computer-implemented automatic tracing algorithm for a quantitative analysis of continuous structures as recited in claim 5, further comprising the step of:

S5: performing a quantitative analysis by the voxel code at the position of the characteristic element, and the quantitative analysis comprising one or a combination of the computations selected from the collection of computing the quantity of the characteristic elements, computing the lengths of the characteristic elements, computing the cross-sectional widths of the characteristic elements, computing the surface areas of the characteristic elements, computing the cross-sectional areas of the characteristic elements, computing the volumes of the characteristic elements, computing the center line trends of the characteristic elements, computing a distance between any two characteristic elements of the continuous structure, and computing an angle of relative positions of any two characteristic elements.

7. The computer-implemented automatic tracing algorithm for a quantitative analysis of continuous structures as recited in claim 5, wherein the starting point voxel described in the step S2' is one selected from the collection of any pixel at any edge of the 3D image and any pixel of any central area of any characteristic element.

8. The computer-implemented automatic tracing algorithm for a quantitative analysis of continuous structures as recited in claim 5, wherein the intensity threshold of the 3D image as described in the step S1' is set by one or a combination of factors selected from the collection of the quality, noise condition, selected color and selected gray scale of the 3D image.

9. A computer-implemented automatic tracing algorithm for a quantitative analysis of continuous structures, applied for analyzing a 2D image of the continuous structures, and each the continuous structure having at least one characteristic element, and the algorithm comprising the steps of:

SS1: capturing a 2D image of the continuous structure and digitizing the 2D image such that the 2D image is comprised of a plurality of pixels;

SS2: selecting a starting point and assigning a starting point code N1 to the starting point, wherein the starting point is selected from any pixel of the 2D image;

SS3: setting an intensity threshold of the 2D image, and encoding all the pixels of the 2D image that match with the intensity threshold from the starting point, and the step SS3 further comprising the steps of:

SS31: assigning a pixel code to all pixels adjacent to the starting point N1 and matched with the intensity threshold, wherein the pixel code is incremented from the starting point code N1 by an integer to N2;

SS32: using the pixel with a pixel code of N2 as an adjacent starting point, and assigning a pixel code of N3 to each the pixel adjacent to the pixel with the pixel code of N2 and matched with the intensity threshold;

SS33: repeating the step SS32 until all the pixels of the 2D image matched with the intensity threshold are encoded; and SS4: using a standard code tracking to identify the characteristic element of the 2D image, and the standard code tracking further comprising the steps of:

SS41: setting a tracing codelet (Np+t−1, Np+t−2, . . . , Nt), wherein the tracing codelet is comprised of the three or more connected pixels, the tracing codelet has a length of p pixels, a starting point at a pixel with a pixel code of Np+t−1, an end point at a pixel with a pixel code of Nt, and an integer t starts at 1 and increases as a tracing progress;

SS42: tracing by using the tracing codelet from each direction of the starting point to the adjacent pixel code by a source field encoding methodology;

SS43: using the adjacent pixel code as a starting point of the tracing codelet and repeating the step SS42 until all pixel codes of the 2D image are traced; and SS44: determining each the characteristic element in the 2D image of the continuous structure, and recording the pixel code at the position of the characteristic element of the continuous structure.

10. The computer-implemented automatic tracing algorithm for a quantitative analysis of continuous structures as recited in claim 9, further comprising the step of:

SS5: performing a quantitative analysis of the pixel code from the position of the characteristic element, and the quantitative analysis comprising one or a combination of the computations selected from the collection of computing the quantity of the characteristic elements, computing the lengths of the characteristic elements, computing the cross-sectional widths of the characteristic elements, computing the surface areas of the characteristic elements, computing the cross-sectional areas of the characteristic elements, computing the volumes of the characteristic elements, computing the center line trends of the characteristic elements, computing a distance between any two characteristic elements of the continuous structure, and computing an angle of relative positions of any two characteristic elements.

11. The computer-implemented automatic tracing algorithm for a quantitative analysis of continuous structures as recited in claim 9, wherein the starting point as described in the step SS2 is one selected from the collection of any pixel of any edge of the 2D image and any pixel of any central area of any characteristic element.

12. The computer-implemented automatic tracing algorithm for a quantitative analysis of continuous structures as recited in claim 9, wherein the intensity threshold of the 2D image as described in the step SS3 is set by one or a combination of factors selected from the collection of the quality, noise condition, selected color and selected gray scale of the 2D image.

13. A computer-implemented automatic tracing algorithm for a quantitative analysis of continuous structures, applied for analyzing a 2D image of the continuous structures, and each the continuous structure having at least one characteristic element, and the algorithm comprising the steps of:

SS1': capturing the 2D image of the continuous structure, digitizing the 2D image, setting an intensity threshold of the 2D image, and filtering the 2D image by the intensity threshold, such that the filtered 2D image is comprised of a plurality of pixels;

SS2': selecting a starting point and assigning a starting point code N1 to the starting point, wherein the starting point is selected from any pixel of the 2D image;

SS3': encoding all the pixels of the 2D image, and the step SS3' further comprising the steps of:

SS31': assigning a pixel code to the pixel adjacent to the starting point N1, wherein the pixel code is incremented from the starting point code N1 by an integer to N2;

SS32': using the pixel with a pixel code of N2 as an adjacent starting point, and assigning a pixel code of N3 to each the pixel adjacent to the pixel with the pixel code of N2; and SS33': repeating the step SS32 until all pixels of the 2D image are encoded; and SS4: using a standard code tracking to identify the characteristic element of the 2D image, and the standard code tracking comprising the steps of:

SS41: setting a tracing codelet (Np+t−1, Np+t−2, . . . , Nt), wherein the tracing codelet is comprised of the three or more connected pixels, the tracing codelet has a length of p pixels, a starting point at a pixel with a pixel code of Np+t−1, an end point at a pixel with a pixel code of Nt, and an integer t starts at 1 and increases as a tracing progress;

SS42: tracing by using the tracing codelet from each direction of the starting point to the adjacent pixel code by a source field encoding methodology;

SS43: using the adjacent pixel code as a starting point of the tracing codelet and repeating the step SS42 until all the pixel codes of the 2D image are traced; and SS44: determining each the characteristic element in the 2D image of the continuous structure, and recording the pixel code at the position of the characteristic element of the continuous structure.

14. The computer-implemented automatic tracing algorithm for a quantitative analysis of continuous structures as recited in claim 13, further comprising the step of:

SS5: performing a quantitative analysis of the pixel code from the position of the characteristic element, and the quantitative analysis comprising one or a combination of the computations selected from the collection of computing the quantity of the characteristic elements, computing the lengths of the characteristic elements, computing the cross-sectional widths of the characteristic elements, computing the surface areas of the characteristic elements, computing the cross-sectional areas of the characteristic elements, computing the volumes of the characteristic elements, computing the center line trends of the characteristic elements, computing a distance between any two characteristic elements of the continuous structure, and computing an angle of relative positions of any two characteristic elements.

15. The computer-implemented automatic tracing algorithm for a quantitative analysis of continuous structures as recited in claim 13, wherein the starting point as described in the step SS2' is one selected from the collection of any pixel at any edge of the 2D image and any pixel of any central area of any characteristic element.

16. The computer-implemented automatic tracing algorithm for a quantitative analysis of continuous structures as recited in claim 13, wherein the intensity threshold of the 2D image as described in the step SS1' is set by one or a combination of factors selected from the collection of the quality, noise condition, selected color and selected gray scale of the 2D image.

17. A computer-implemented automatic tracing algorithm for a quantitative analysis of continuous structures, applied for analyzing a 3D image comprised of a plurality of voxels of the continuous structures, and each the continuous structure having at least one characteristic element, and the algorithm comprising the steps of:

setting a tracing codelet (Np+t−1, Np+t−2, ..., Nt), which is comprised of the three or more connected voxels, wherein the tracing codelet has a length of p voxels, a starting point at a voxel with a voxel code of Np+t−1, an end point at a voxel with a voxel code of Nt, and an integer t starts at 1 and increases as a tracing progress;

tracing by the tracing codelet from each direction of a starting point voxel to an adjacent voxel code by using a source field encoding methodology;

using the adjacent voxel code as a tracing codelet starting point and repeating the tracing step until all the voxel codes of the 3D image are traced; and determining each the characteristic element in the 3D image of the continuous structure, and recording the voxel code at a position of the characteristic element of the continuous structure.

18. The computer-implemented automatic tracing algorithm for a quantitative analysis of continuous structures as recited in claim 17, further comprising the step of:

performing the quantitative analysis by the voxel code at the position of the characteristic element, and the quantitative analysis comprising one or a combination of the computations selected from the collection of computing the quantity of the characteristic elements, computing lengths of the characteristic elements, computing cross-sectional widths of the characteristic elements, computing surface areas of the characteristic elements, computing cross-sectional areas of the characteristic elements, computing volumes of the characteristic elements, computing center line trends of the characteristic elements, computing a distance between any two characteristic elements of the continuous structure, and computing an angle of relative positions of any two characteristic elements.

19. The computer-implemented automatic tracing algorithm for a quantitative analysis of continuous structures as recited in claim 17, wherein the starting point voxel is one selected from a collection of any voxel at any edge of the 3D image and any voxel at any central area of any characteristic element.

20. The computer-implemented automatic tracing algorithm for a quantitative analysis of continuous structures as recited in claim 17, further comprising the step of:

setting an intensity threshold of the 3D image, wherein the intensity threshold is set by one or a combination of factors selected from a collection of quality, noise condition, selected color and selected gray scale of the 3D image.

* * * * *